(12) United States Patent  (10) Patent No.: US 7,740,282 B2
McNutt et al.  (45) Date of Patent: Jun. 22, 2010

(54) PORT IDENTIFICATION SYSTEM AND METHOD

(75) Inventors: Patrick S. McNutt, Carnation, WA (US); Phillip Phung, Kirkland, WA (US); James Lee Martin, Bonney Lake, WA (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 771 days.

(21) Appl. No.: 11/381,940

(22) Filed: May 5, 2006

(65) Prior Publication Data

US 2007/0274515 A1 Nov. 29, 2007

(51) Int. Cl.
*B42D 15/00* (2006.01)
*G09C 3/00* (2006.01)
*G09F 3/18* (2006.01)
*G09F 3/20* (2006.01)

(52) U.S. Cl. .................... 283/109; 283/72; 283/74; 283/81; 283/98; 283/117; 40/649; 40/737

(58) Field of Classification Search .............. 40/649, 40/737; 439/488, 491, 536; 283/72, 74, 283/81, 98, 109, 117; *H01R 3/00*
See application file for complete search history.

(56) References Cited

U.S. PATENT DOCUMENTS

| 2,041,097 | A | * | 5/1936 | Vierling ................. 40/119 |
| 3,409,347 | A | * | 11/1968 | Vogel ..................... 359/808 |
| 5,613,874 | A | * | 3/1997 | Orlando et al. ......... 439/491 |
| 2006/0059757 | A1 | * | 3/2006 | Didulo .................. 40/737 |

* cited by examiner

*Primary Examiner*—Dana Ross
*Assistant Examiner*—Justin V Lewis
(74) *Attorney, Agent, or Firm*—Davis Wright Tremaine LLP; George C. Rondeau, Jr.; Heather M. Colburn

(57) ABSTRACT

A cable port identification system is disclosed that provides identification facilities for communication, data, other cabling and/or wires and the connectors to which they are coupled found in a multi-port station. In some implementations the identification facilities can include label retention and protection and may also include label magnification.

32 Claims, 39 Drawing Sheets

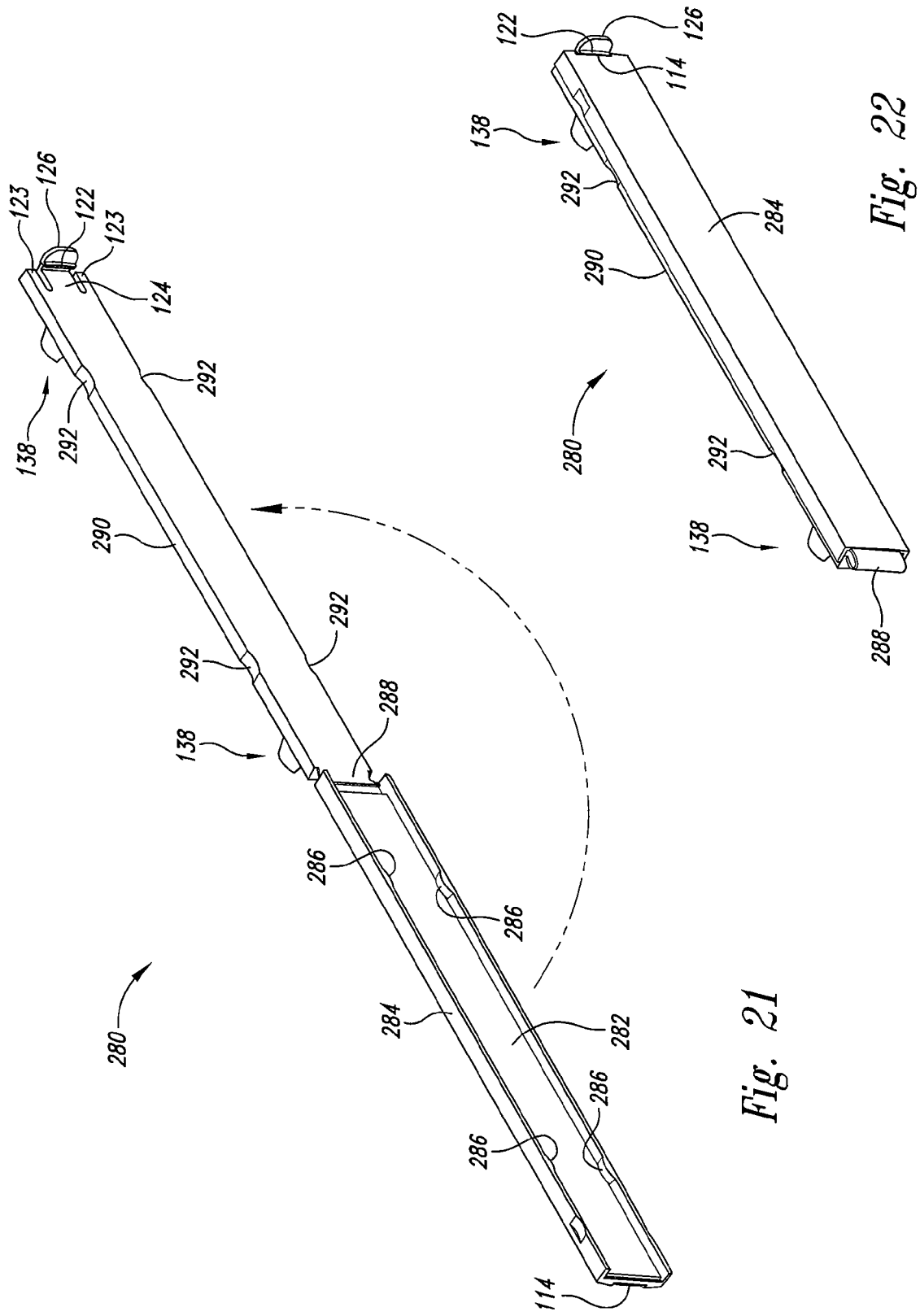

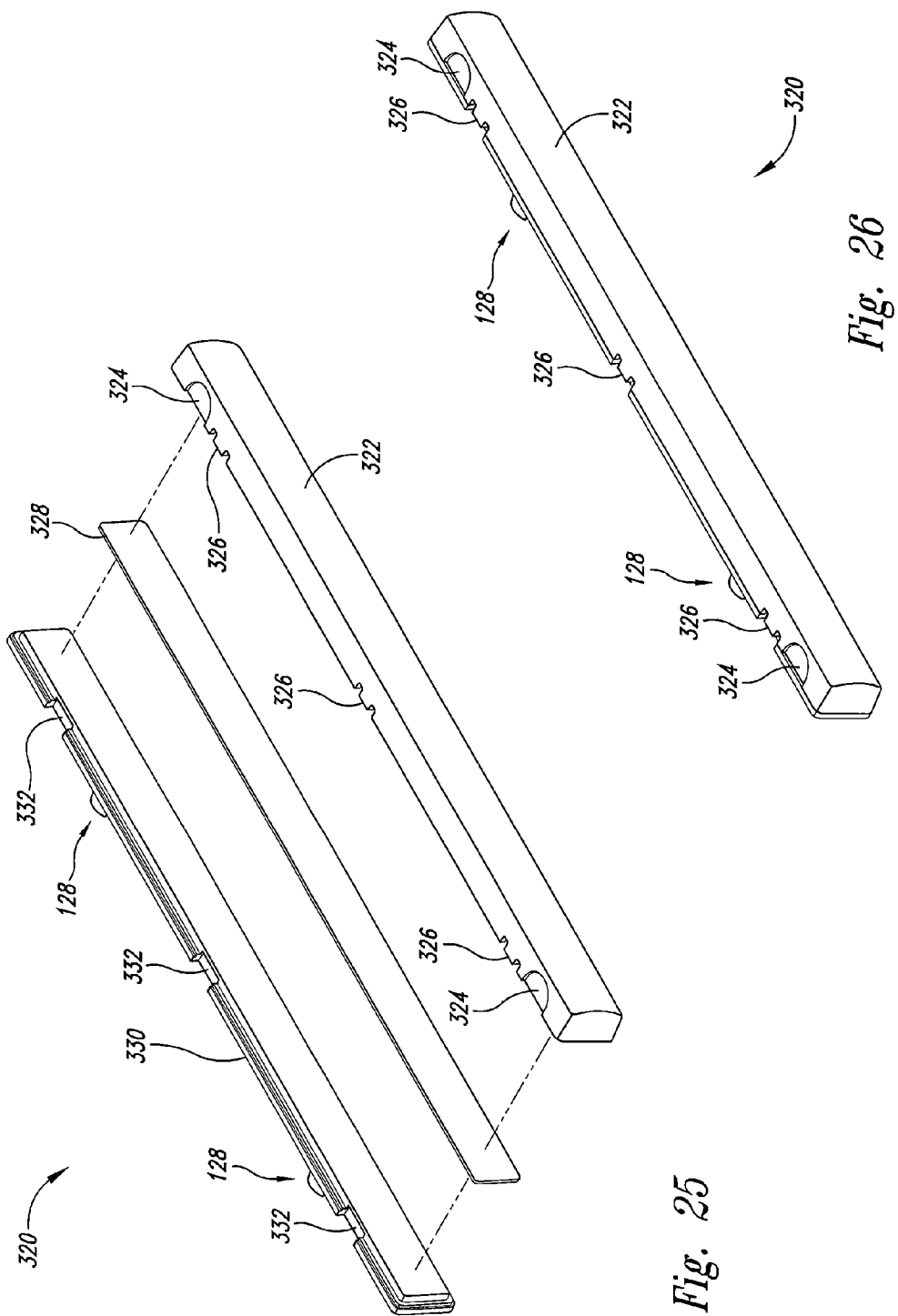

PORT IDENTIFICATION SYSTEM AND METHOD

BACKGROUND OF THE INVENTION

1. Field of the Invention

The present invention is generally related to multi-port stations for communication connectors.

2. Description of the Related Art

Connectors are used to couple communication and/or data cabling and/or wires with other communication, data or other cabling and/or wires. Conventional multi-port stations, such as patch panels, wall plates, etc. retain one or more of the connectors and can be mounted on walls, in communication and/or racks, etc. As installed, the connectors and cabling can raise management challenges associated with keeping track of which cable is connected to which equipment or keeping track of which cable is part of a particular circuit.

BRIEF DESCRIPTION OF THE SEVERAL VIEWS OF THE DRAWING(S)

FIG. 21 is an isometric front view of the fourth label implementation of FIG. 20 in an open position.

FIG. 22 is an isometric front view of the fourth label implementation of FIG. 20 in a closed position.

FIG. 25 is an exploded isometric front view of the fifth label implementation of FIG. 24.

FIG. 26 is an isometric front view of the fifth label implementation of FIG. 24 in a closed position.

DETAILED DESCRIPTION OF THE INVENTION

A cable port identification system is disclosed that provides identification facilities for communication, data, other cabling and/or wires and the connectors to which they are coupled found in a multi-port station. In some implementations the identification facilities includes label retention and protection, and may also include label magnification such as including a cover formed as a lens.

Figure 1:
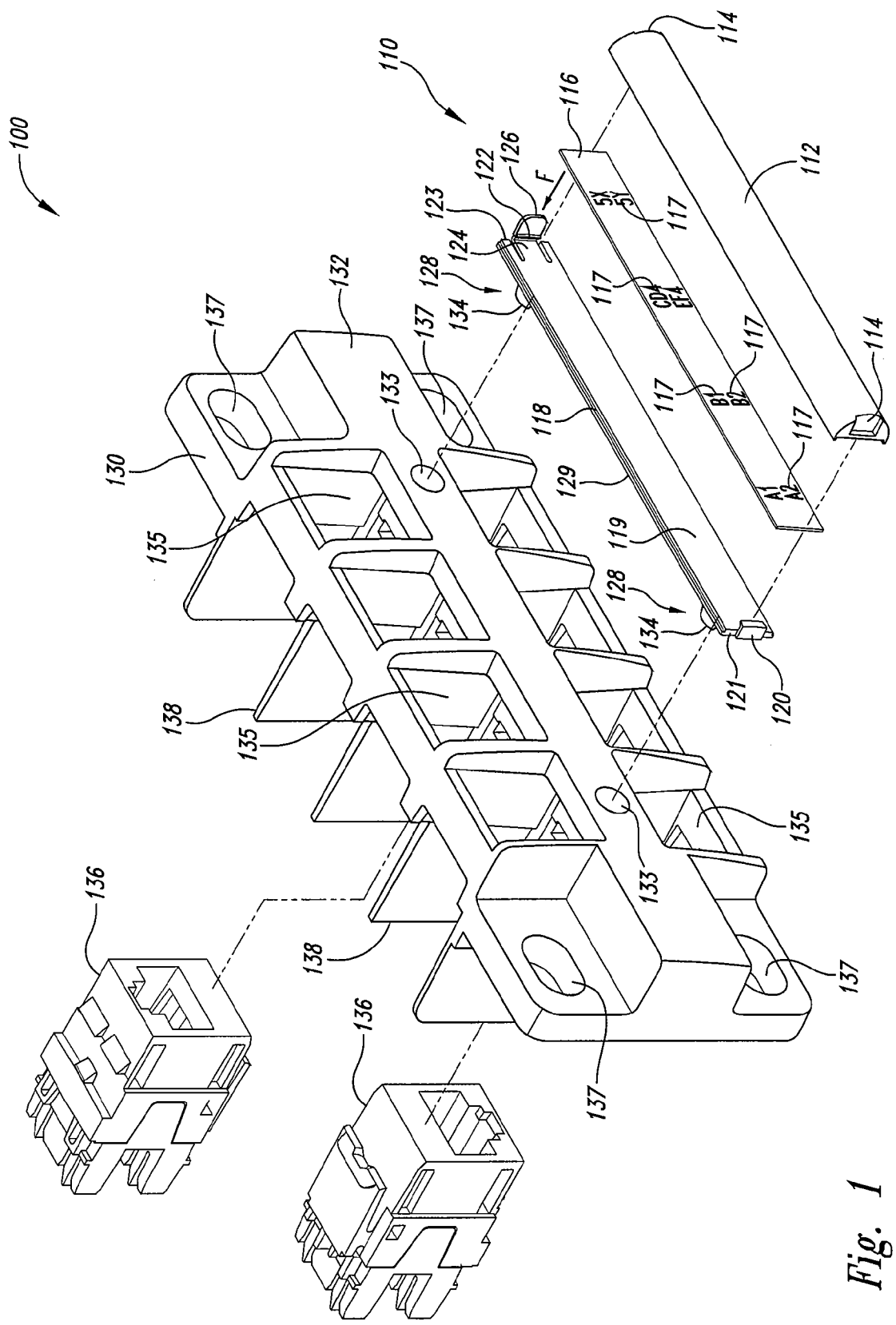
FIG. 1 is an exploded isometric front view of a first combination of a first label implementation and a first multi-port station.

A first combination 100 is shown in FIG. 1 to include a first label implementation 110 having an elongated transparent cover 112 with end-notches 114, and elongated label media 116, such as being made from paper, card stock, plastic or other material that can be marked with either a pencil, pen, marker, print device such as a printer, label maker, etc. The cover 112 can be formed as a lens with or without magnification aspects to aid in displaying alpha-numeric characters, signs, symbols, or other information on the label media 116 such as marks 117. The first label implementation 110 also includes an elongated backing 118 having a front surface 119 to receive the label media 116. The first label implementation 110 has a first end-fastener 120 position on a first end 121 and extending away from the front surface 119 to be engageable with one of the end-notches 114 and has a second end-fastener 122 positioned on a second end 123 and extending away from the front surface to be engageable with the other of the end-notches 114. The second end-fastener 122 is coupled with a leaf spring portion 124 of the backing 118 that is kept in tension as the second end-fastener is engaged with the end-notch 114. The second end-fastener 122 is coupled to a push-tab 126 that is positioned to receive a force, F, from a user to disengage the second end-fastener 122 with the end-notch 114.

The backing 118 further includes pegs 128 (better shown in FIG. 2) that extend from a back surface 129 of the backing 118 to be engageable with a first multi-port station 130 shown in FIG. 1. The first multi-port station 130 includes a centrally located longitudinal support 132 with holes 133 sized and positioned to receive the pegs 128 for engagement of the first label implementation 110 with the first multi-port station 130. Each of the pegs 128 has two split-portions 134 that are kept in tension to further secure the peg in the hole 133 when the first label implementation 110 is engaged with the first multi-port station 130.

Figure 3:
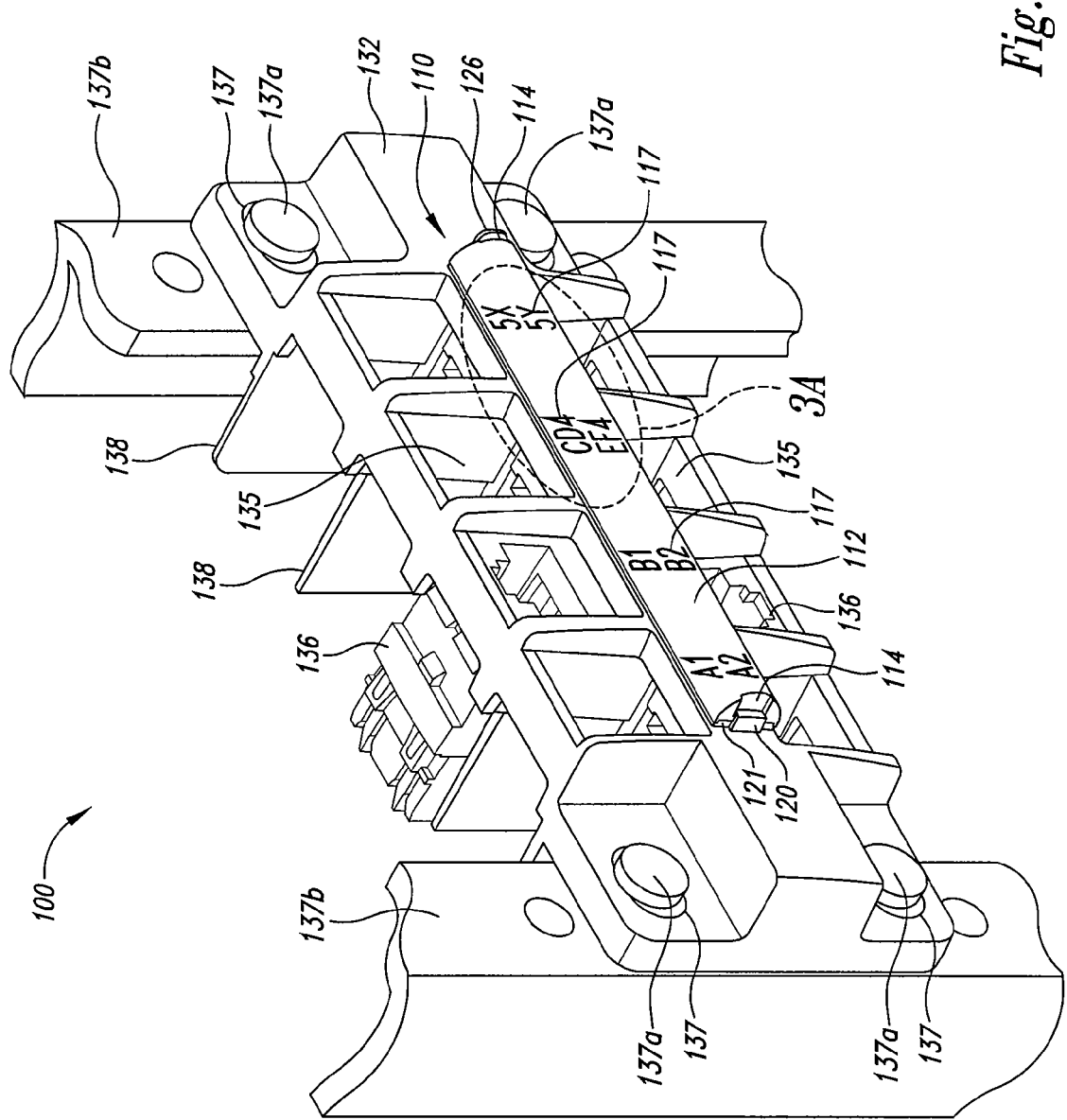
FIG. 3 is an isometric front view of the first combination of FIG. 1.
Figure 3A:
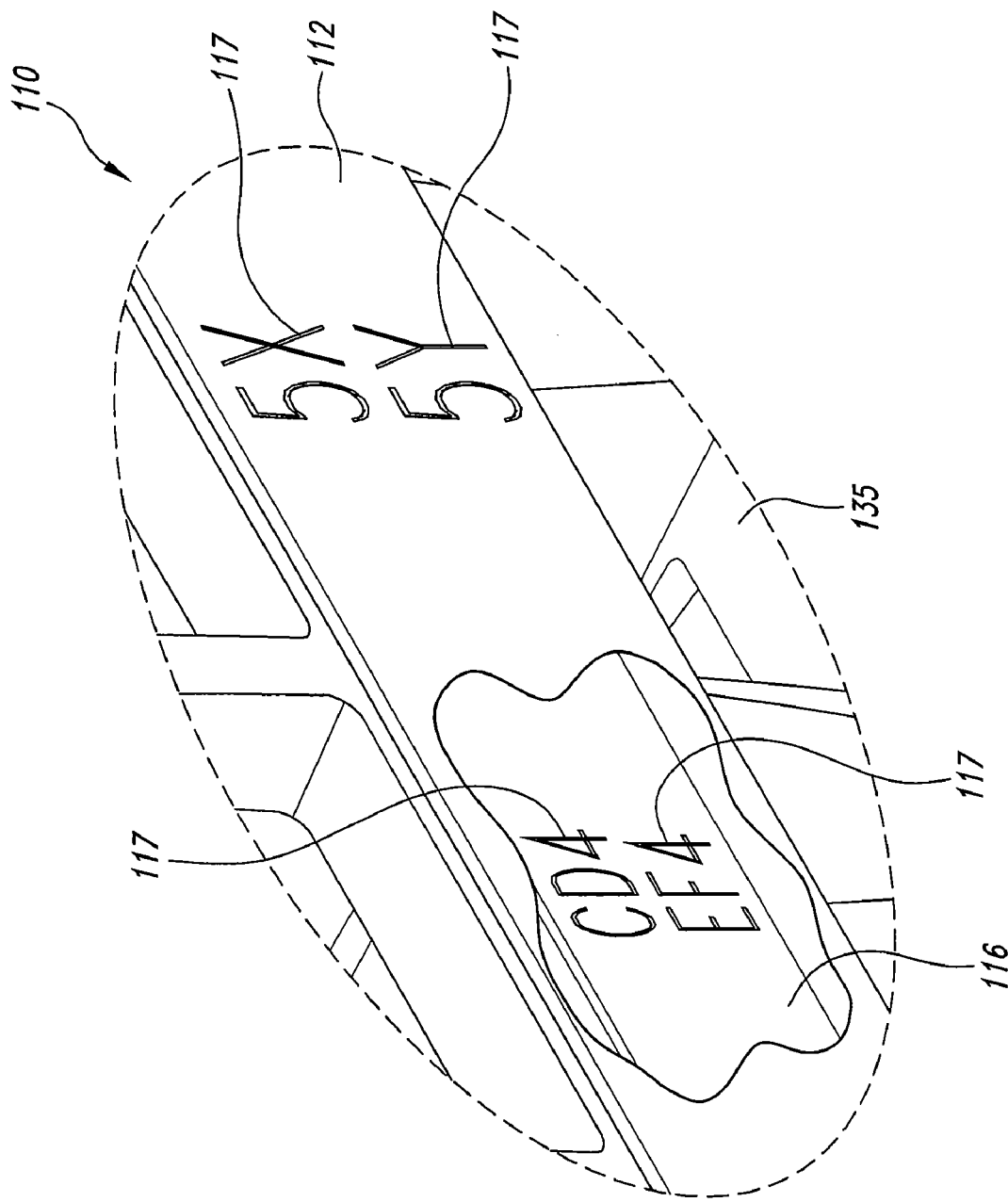
FIG. 3A is an isometric front view of the first combination of FIG. 1 with a portion of the cover removed.

The first label implementation 110 is shown in FIG. 3 as engaged with the first multi-port implementation 130. The first multi-port station 130 has rows of ports 135 on either side of the support 132 to receive connectors 136 as shown in FIG. 3. Placement of the first label implementation 110 is between the two rows of the ports 135 when the first label implementation is engaged with the first multi-port station 130. The cover 112 of the first label implementation 110 is depicted has being formed to provide visual magnification of the marks 117 when the label media 116 is positioned adjacent the cover with the marks facing the cover. Each of the marks 117 are arranged on the label media 116 to be adjacent its respective one of the ports 135 when the first label implementation 110 is engaged with the first multi-port implementation 130. A portion of the cover 112 is removed in FIG. 3A to expose a portion of the label media 116 having two of the depicted marks 117, "CD4" and "EF4", in a visually unmagnified condition as compared with two of the other marks, "5X" and "5Y", shown in FIG. 3A as covered and consequently having a magnified visual presentation.

Figure 2:
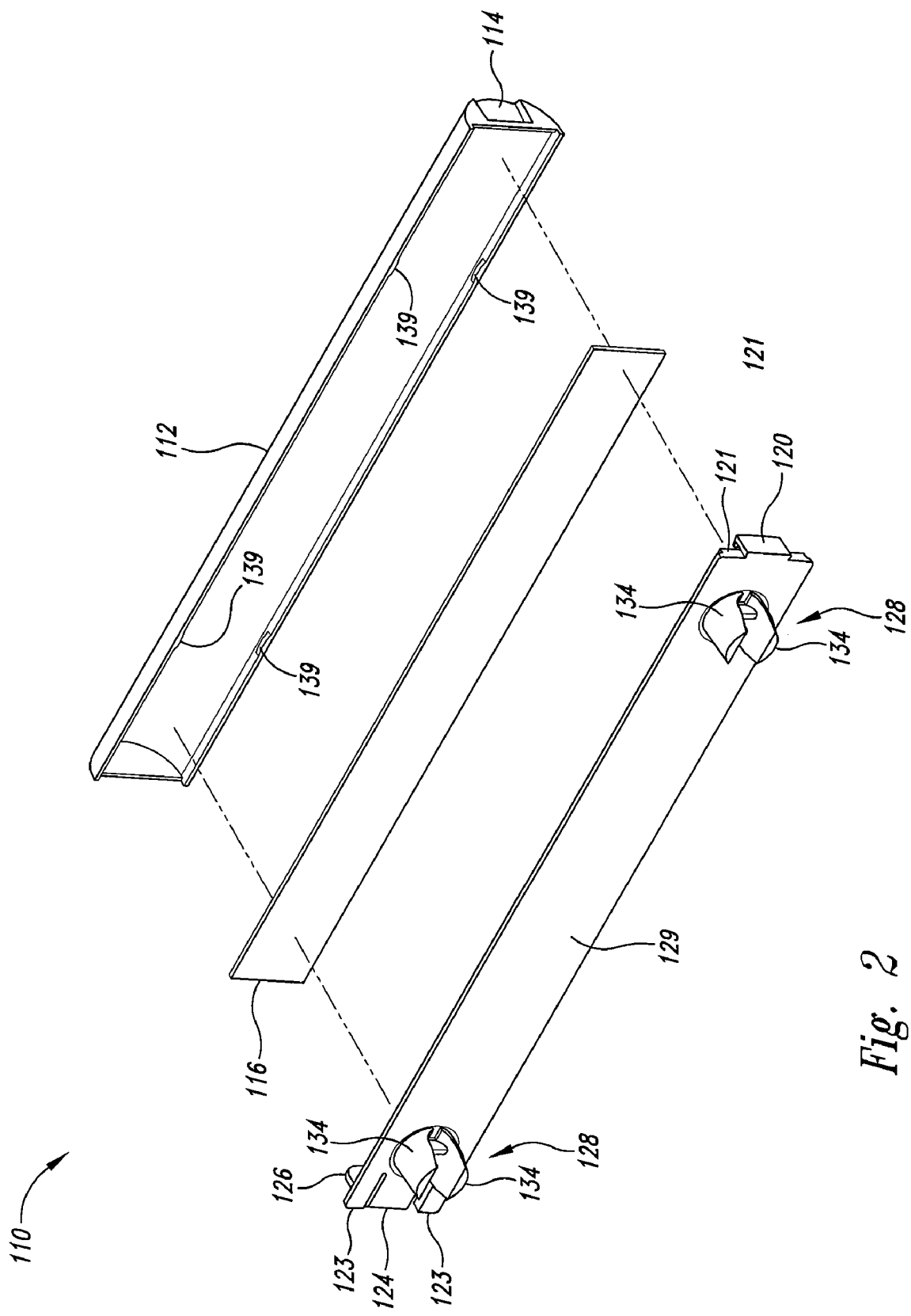
FIG. 2 is an exploded isometric rear view of the first labeling implementation of FIG. 1.

The first multi-port station 130 has openings 137 to receive bolts 137a to horizontally mount the first multi-port station to a rack 137b or other support structure. The first multi-port station 130 also includes shields 138 to allow for relatively close spacing of the connectors 136 with one another while reducing crosstalk. As shown in FIG. 2, the cover 112 has projections 139 to help retain the label media 116 inside of the cover 112.

Figure 4:
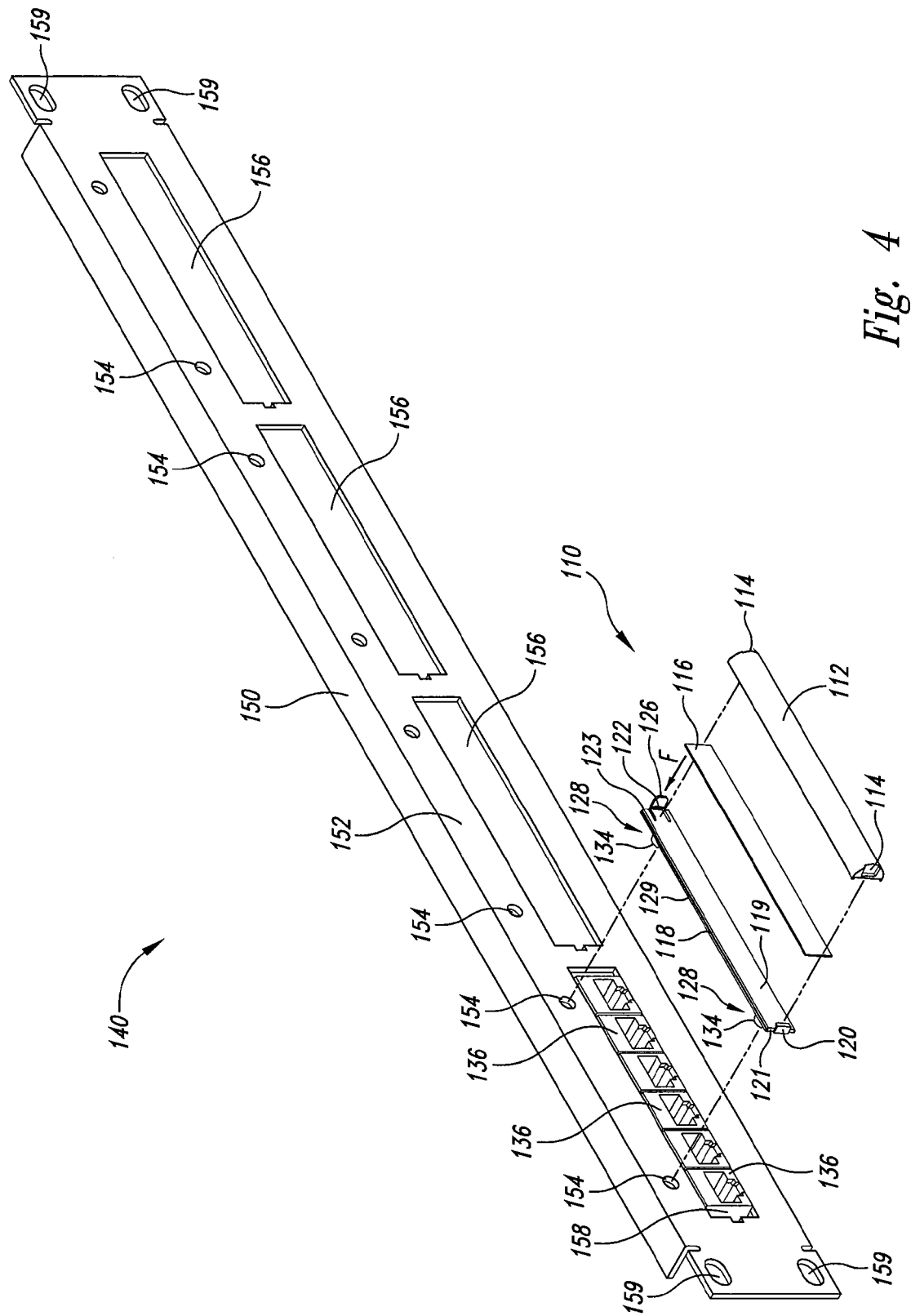
FIG. 4 is an exploded isometric front view of a second combination of the first label implementation and a second multi-port station.
Figure 5:
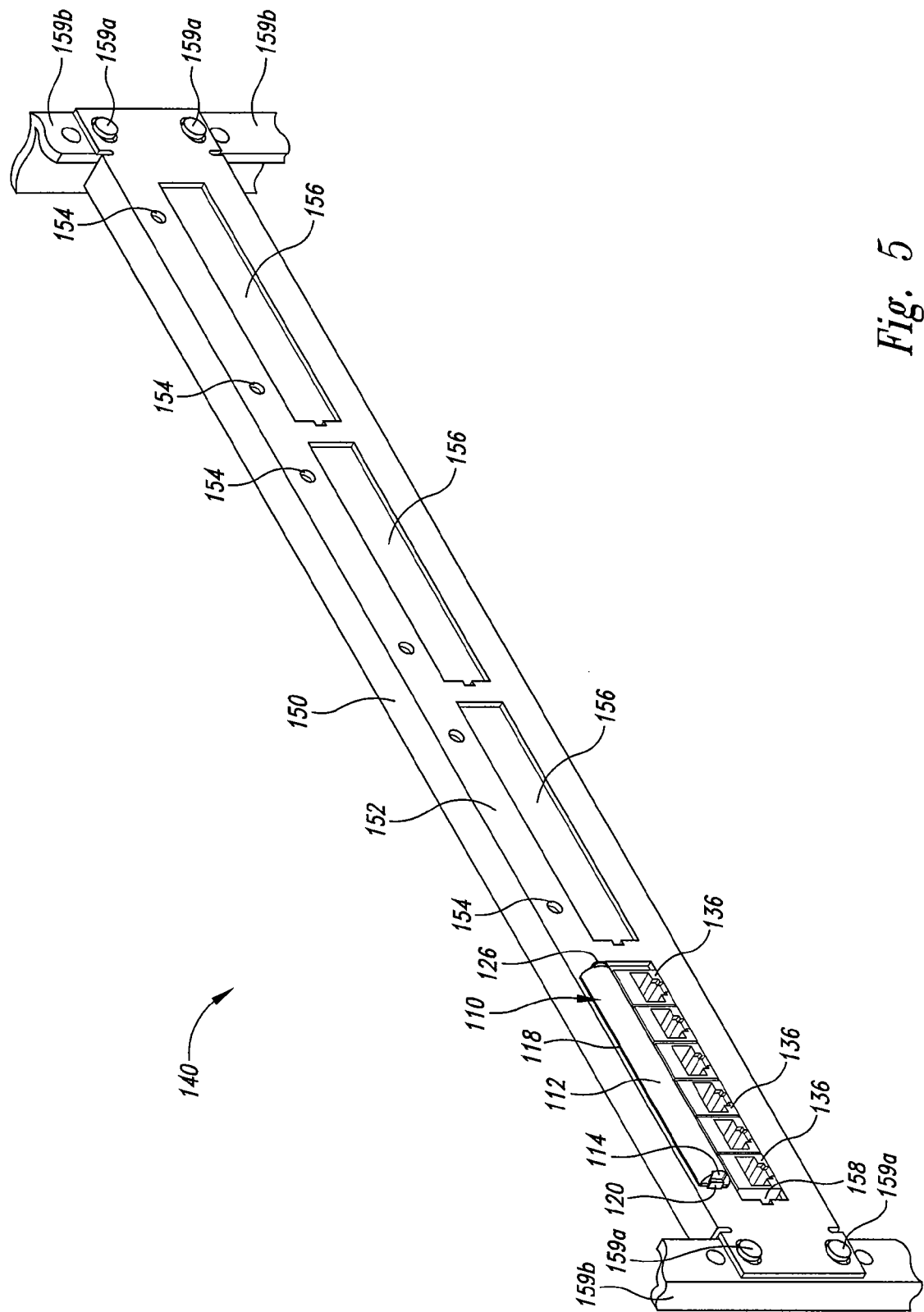
FIG. 5 is an isometric front view of the second combination of FIG. 4.

A second combination 140 is shown in FIG. 4 and FIG. 5 as having an instance of the first label implementation 110 and a second multi-port station 150. The second multi-port station 150 has a front surface 152 with holes 154 sized and spaced to receive the pegs 128 for engagement of the first label implementation 110 with the second multi-port station. The second multi-port station furthermore has port bays 156, each shaped and sized to receive a connector set 158, which has a plurality of connectors 136. The holes 154 are positioned to center each of a plurality of the first label implementations 110 with respect to a different one of the port bays 156 in an adjacent position. The second multi-port station 150 has openings 159 to receive bolts 159a for horizontal mounting with a rack 159b or other support structure, as shown in FIG. 5.

Figure 7:
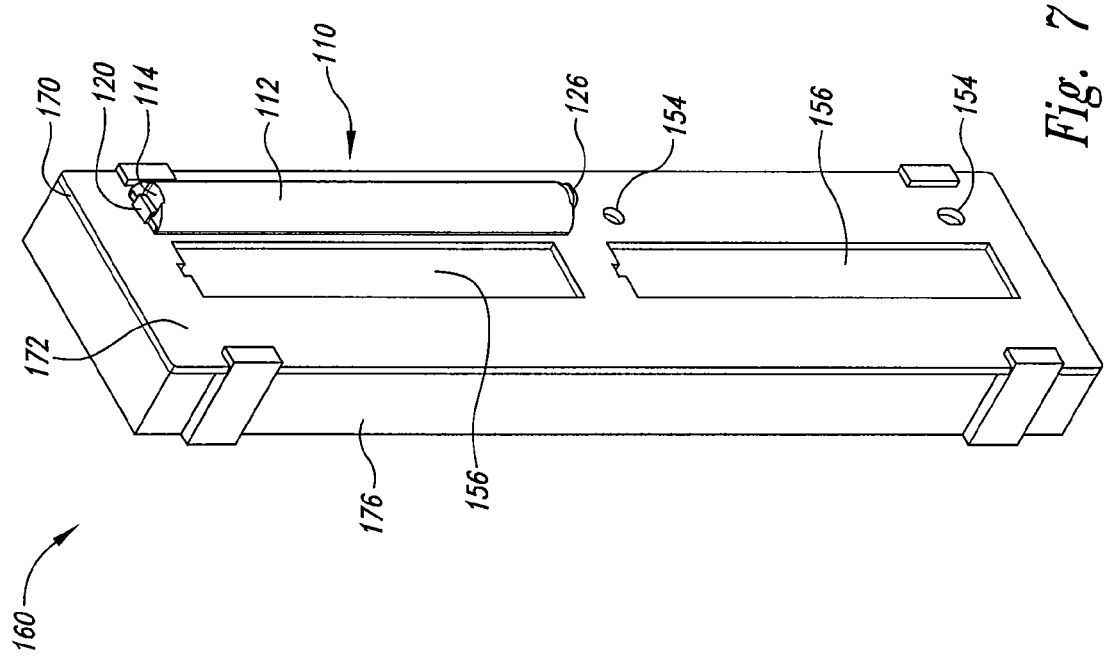
FIG. 7 is an isometric front view of the third combination of FIG. 6.
Figure 6:
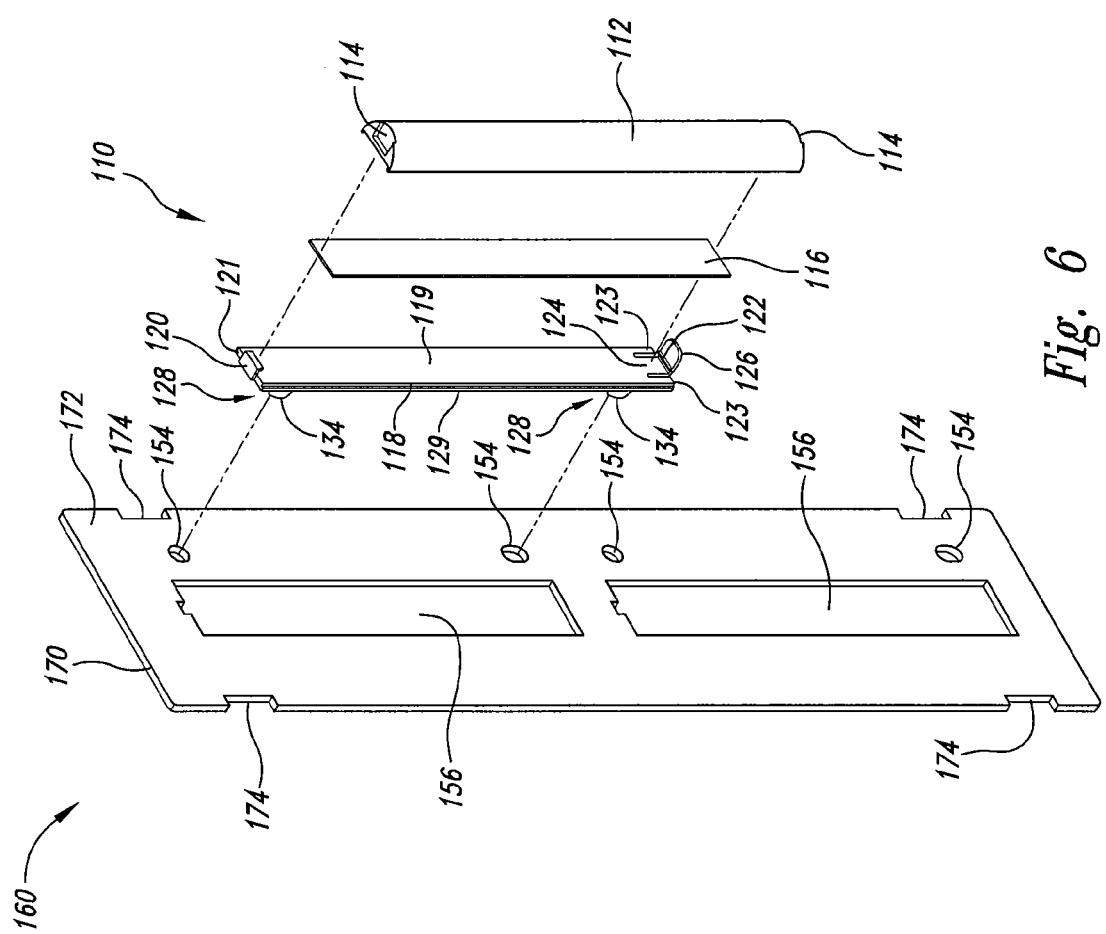
FIG. 6 is an exploded isometric front view of a third combination of the first label implementation of FIG. 1 and a third multi-port station.

A third combination 160 is shown in FIG. 6 and FIG. 7 as having an instance of the first label implementation 110 and a third multi-port station 170. The third multi-port station 170 has a front surface 172 with the holes 154 sized and spaced to receive the pegs 128 in a vertical orientation for engagement of the first label implementation 110 with the third multi-port station. The third multi-port station 170 also has the port bays 156, each shaped and sized to receive one of the connector sets 158 in a vertical orientation having a plurality of connectors, such as the connectors 136 or other connectors. The holes 154 are positioned to center each of a plurality of the first label implementations 110 with respect to a different one of the port bays 156 in an adjacent position. The third multi-port station 170 has notches 174 for mounting in a vertical orientation with a rack 176 or other support structure.

Figure 8:
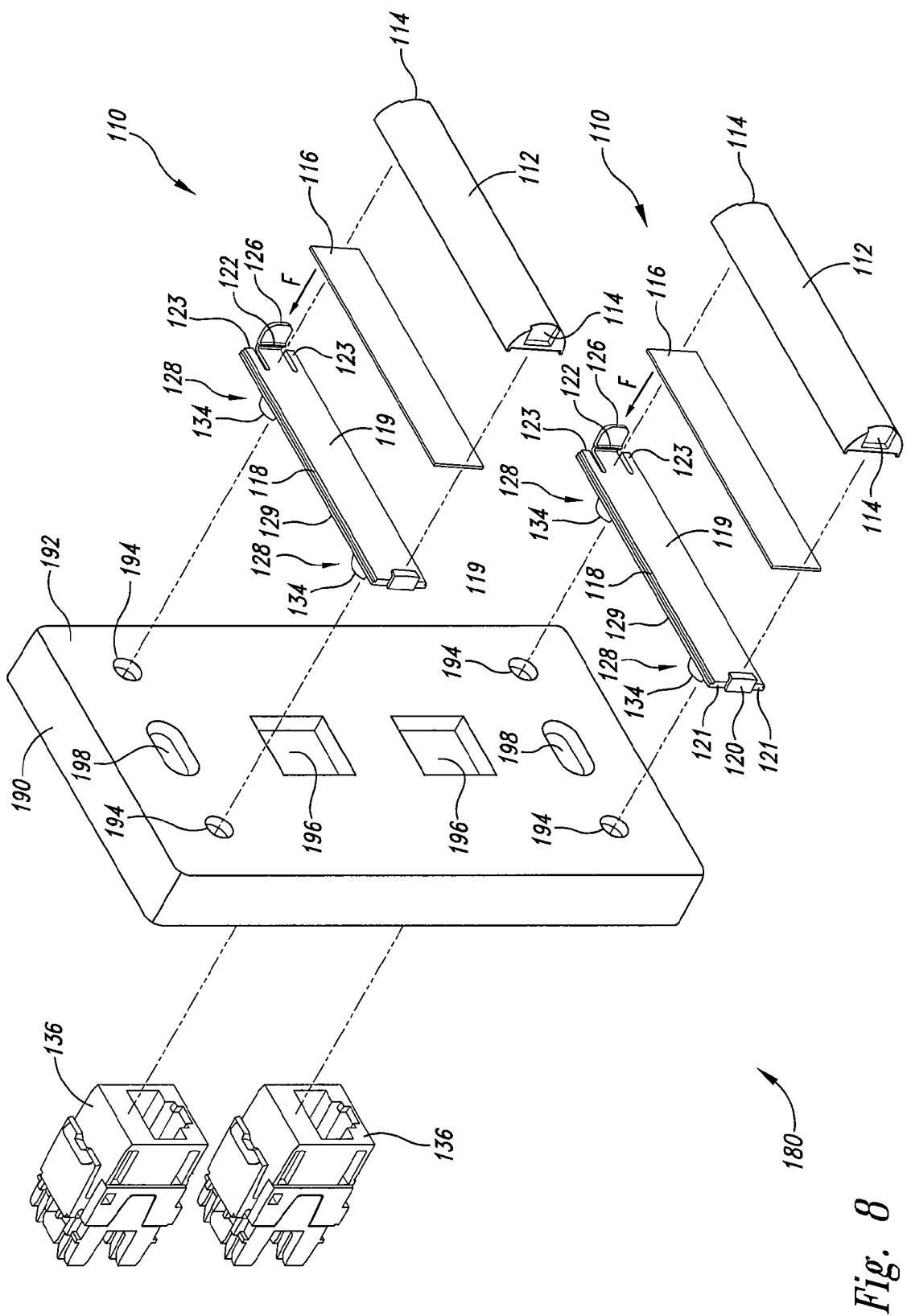
FIG. 8 is an exploded isometric front view of a fourth combination of the first label implementation of FIG. 1 and a fourth multi-port station.
Figure 9:
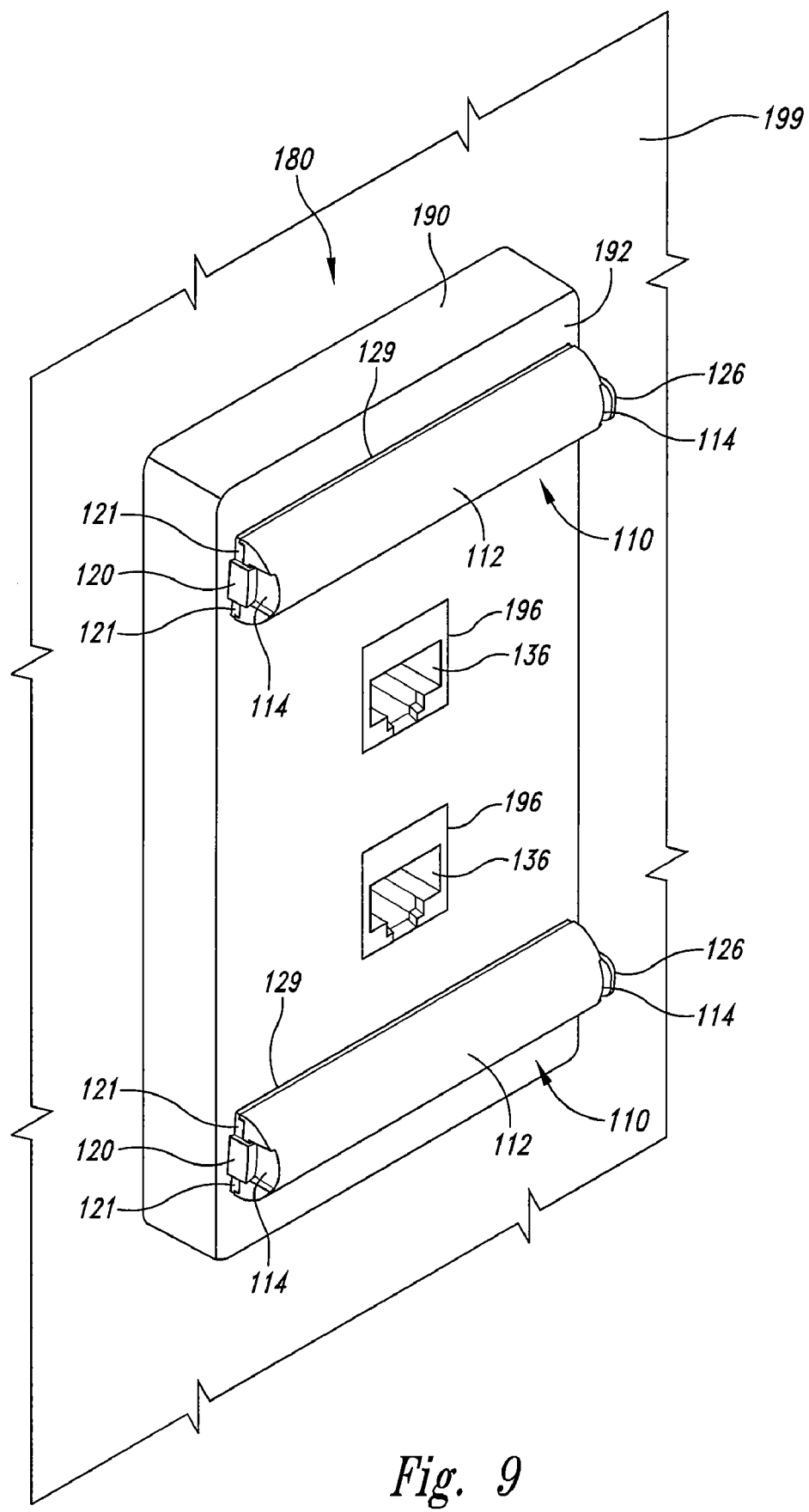
FIG. 9 is an isometric front view of the fourth combination of FIG. 8.

A fourth combination 180 is shown in FIG. 8 and FIG. 9 as having an instance of the first label implementation 110 and a fourth multi-port station 190. The fourth multi-port station 190 has a front surface 192 with holes 194 sized and spaced to receive the pegs 128 of the first label implementation 110. The holes 194 are arranged for a horizontal orientation of the first label implementation 110 with respect to the fourth multi-port station 190. The fourth multi-port station 190 has two ports 196, each shaped and sized to receive a connector, such as one of the connectors 136 or other connectors. The holes 194 are positioned to horizontally center each of two of the first label implementations 110 with respect to a different one of the two ports 196 in an adjacent position. The fourth multi-port station 170 also has openings 198 for mounting at a wall 199.

Figure 10:
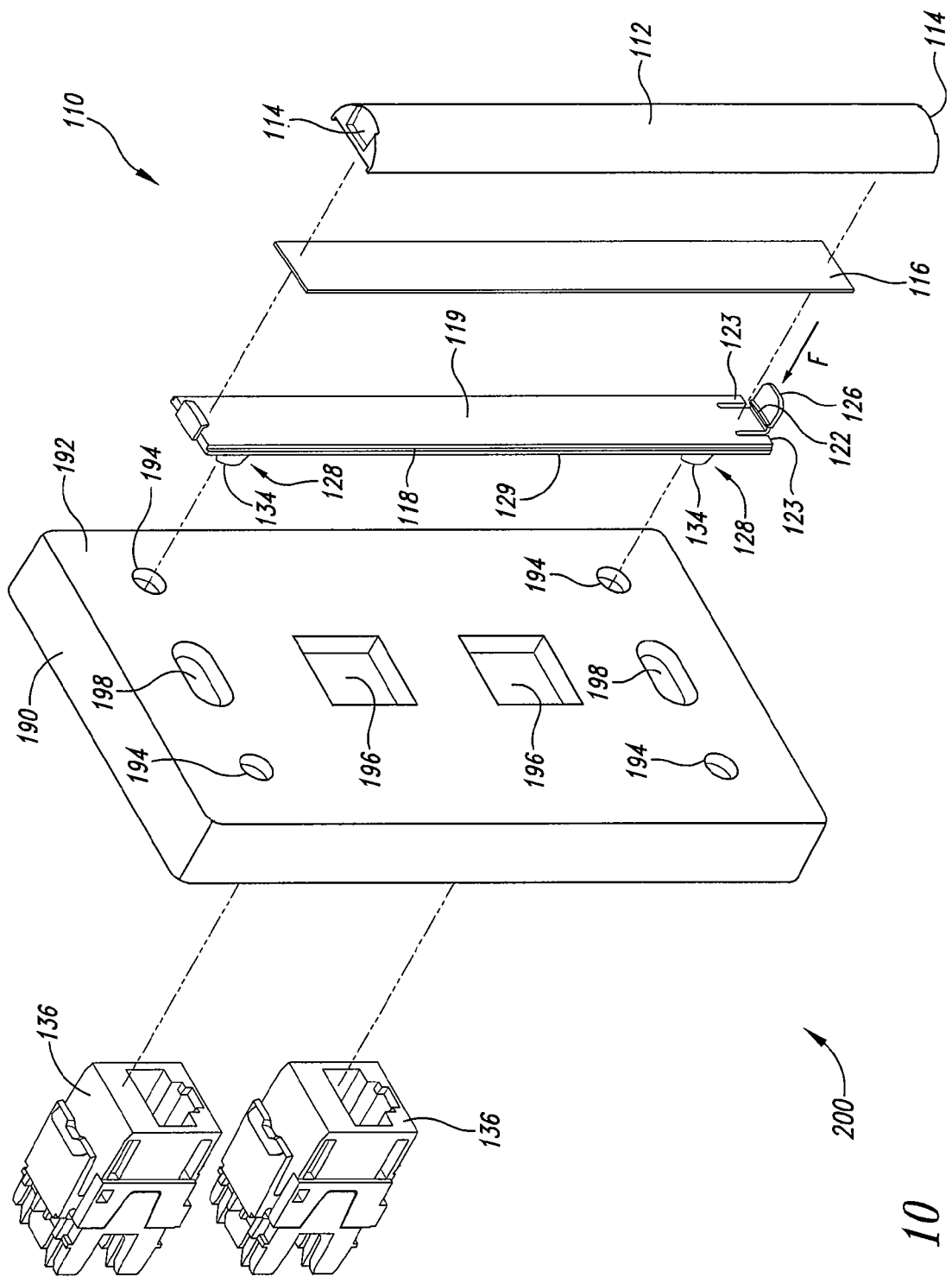
FIG. 10 is an exploded isometric front view of a fifth combination of the first label implementation of FIG. 1 and the fourth multi-port station of FIG. 8.
Figure 11:
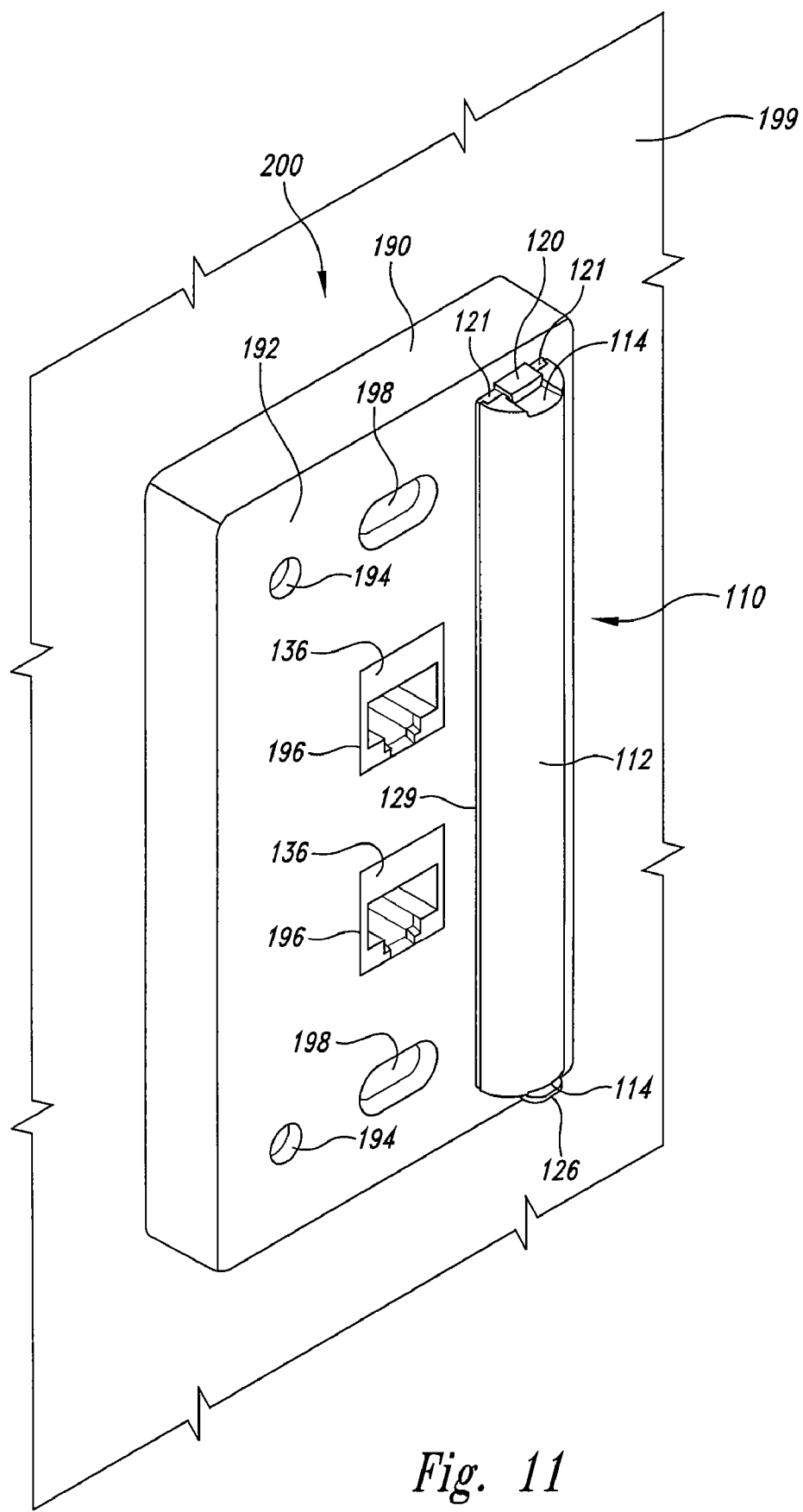
FIG. 11 is an isometric front view of the fifth combination of FIG. 10.

A fifth combination 200 is shown in FIG. 10 and FIG. 11 as having an instance of the first label implementation 110 and the fourth multi-port station 190. The pegs 128 of the first label implementation 110 are spaced to match the spacing of the holes 194 of the fourth multi-port station 190 and arranged for a vertical orientation of the first label implementation with respect to the fourth multi-port station. The holes 194 are positioned to vertically center each of two first label implementations 110 with respect to both of the two ports 196 a position adjacent to both.

Figure 12:
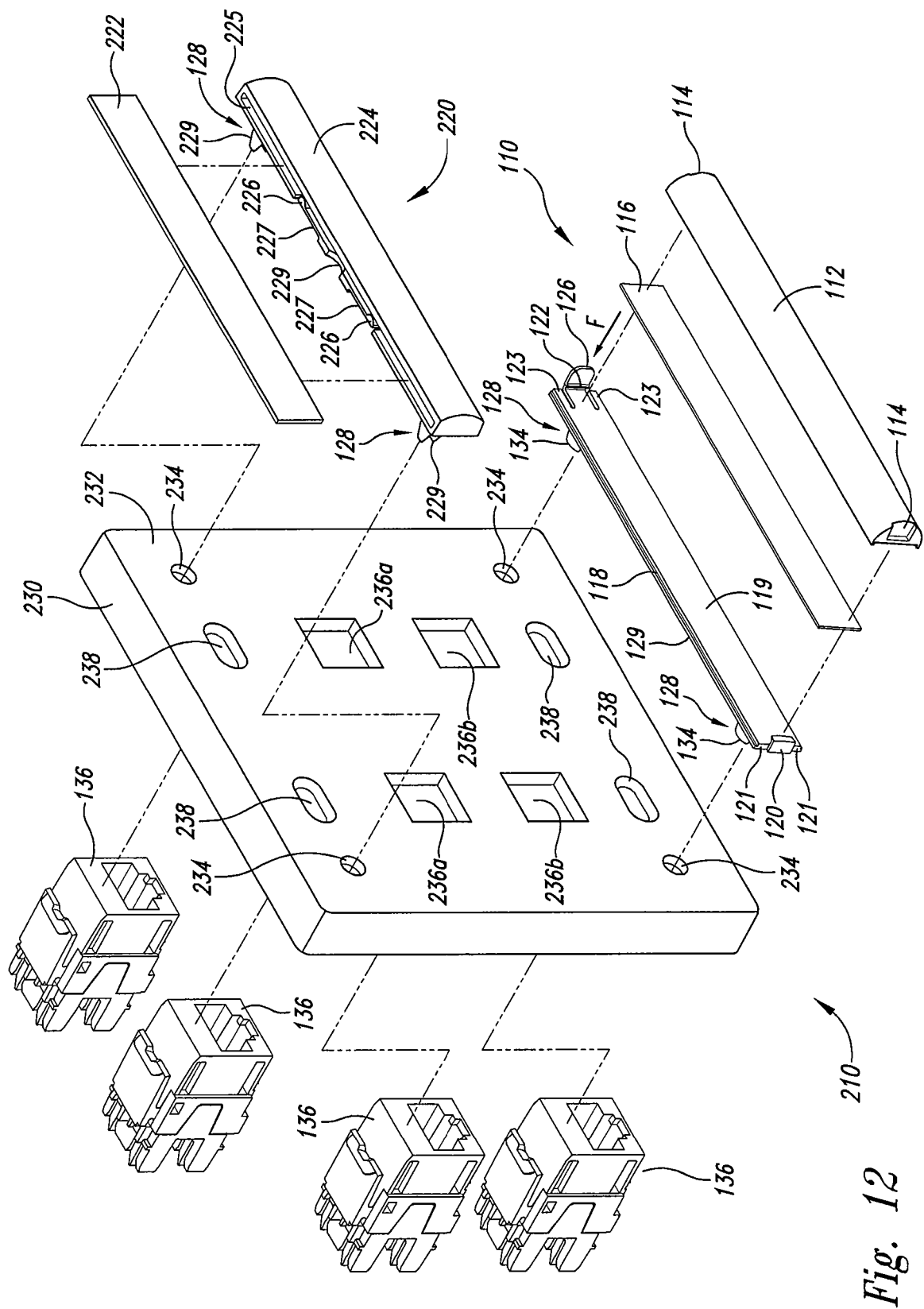
FIG. 12 is an exploded isometric front view of a sixth combination of the first label implementation, a second label implementation and a fifth multi-port station.
Figure 13:
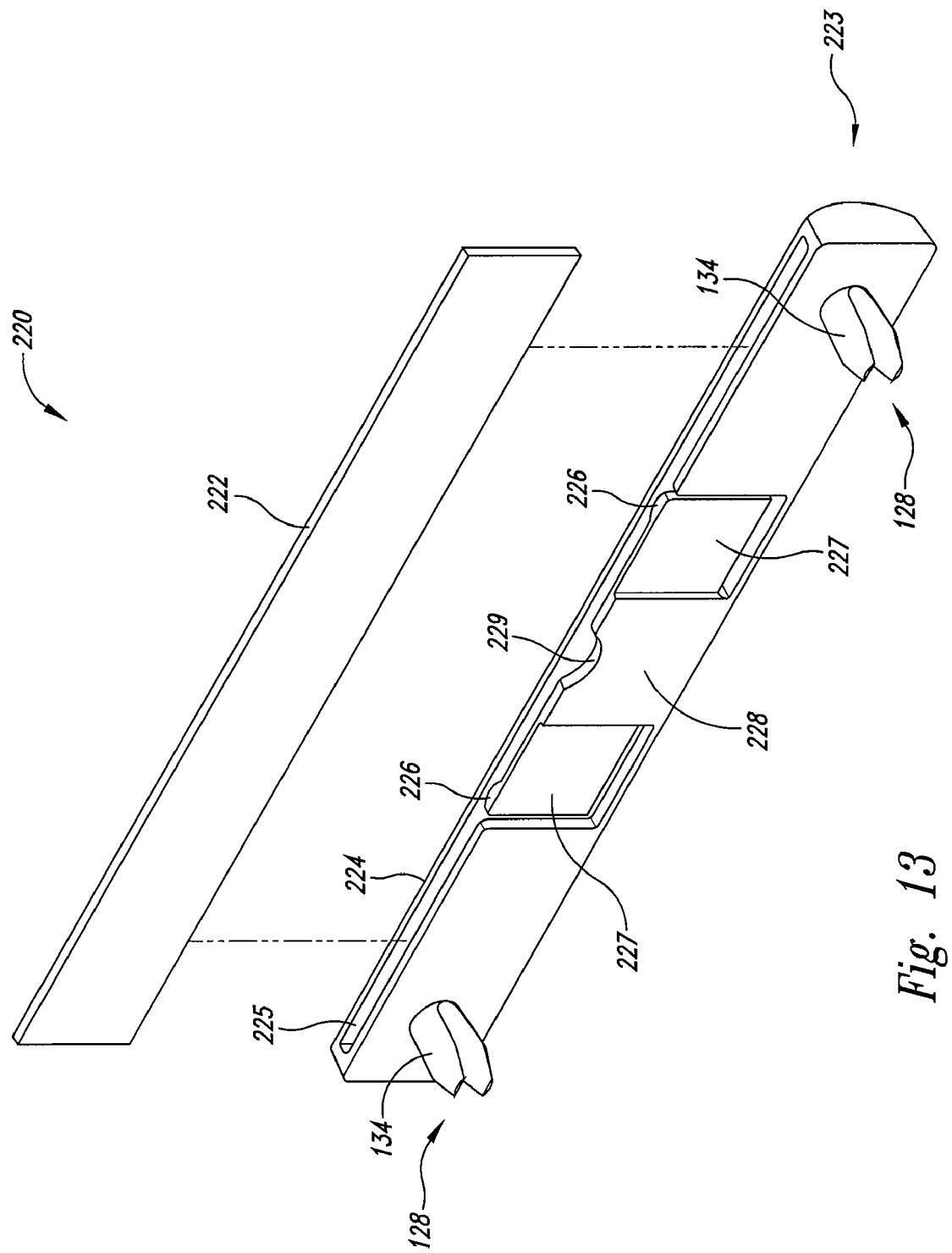
FIG. 13 is an exploded isometric rear view of the second label implementation of FIG. 12.
Figure 14:
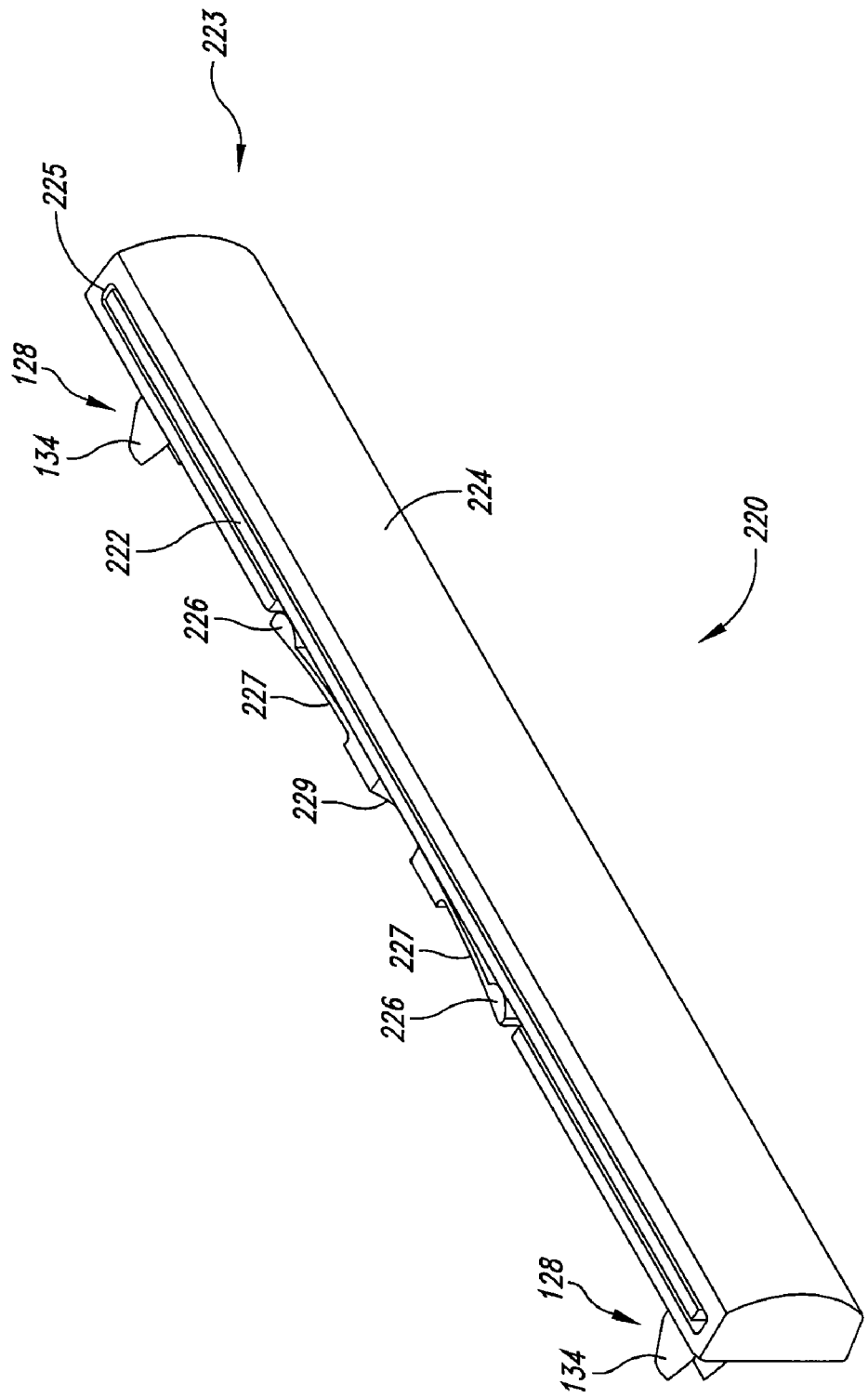
FIG. 14 is an isometric front view of the second label implementation of FIG. 12.
Figure 15:
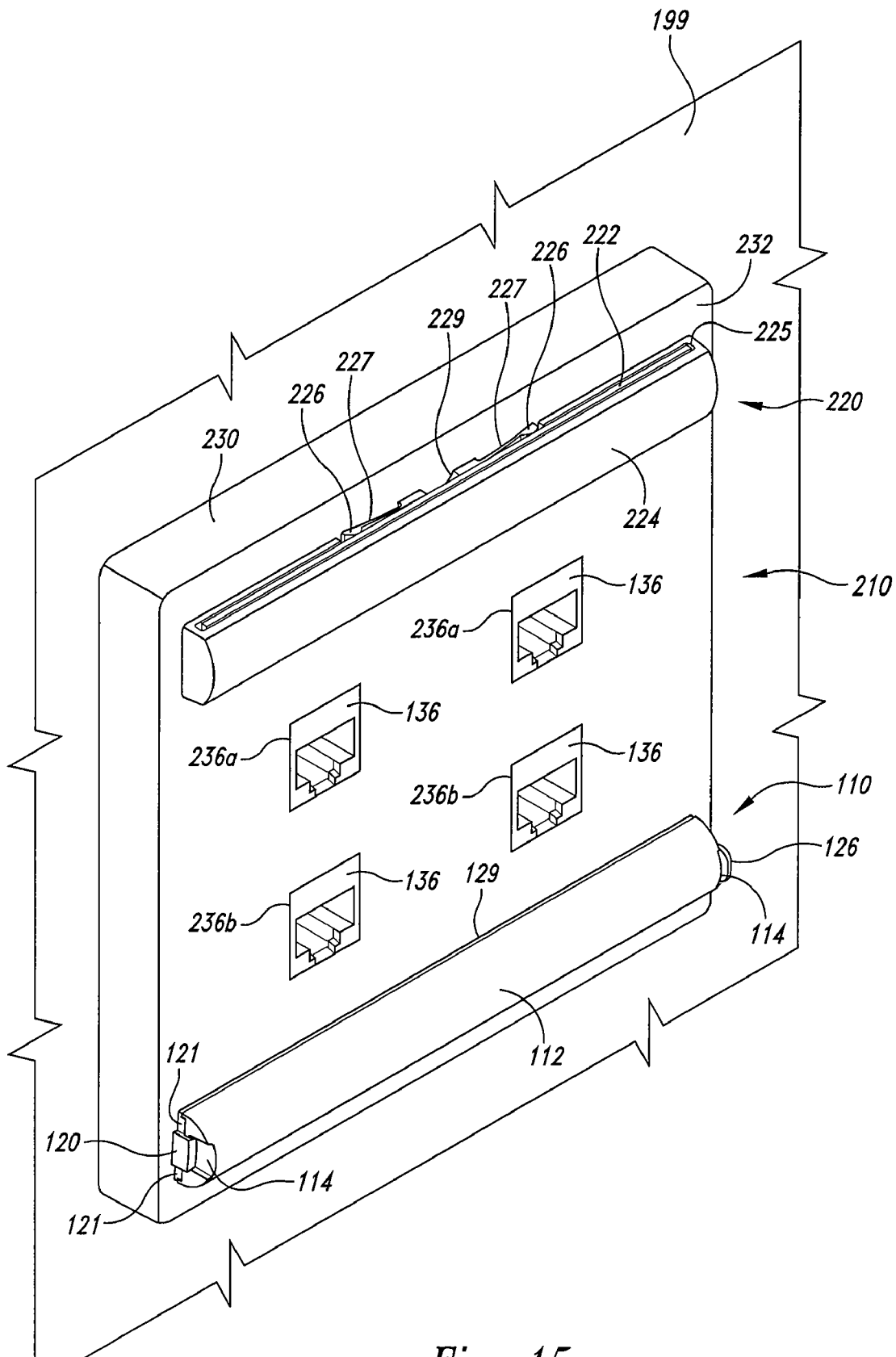
FIG. 15 is an isometric front view of the sixth combination of FIG. 12.

A sixth combination 210 is shown in FIG. 12 and FIG. 15 as having an instance of the first label implementation 110, a second label implementation 220 (also shown in FIG. 13 and FIG. 14) and a fifth multi-port station 230. The second label implementation 220, better shown in FIG. 13, includes a label media 222 and a holder 223 with a transparent cover portion 224 and a slot 225. The holder 223 receives the label media 222 into the slot 225 to be held in position with contact portions 226 of tensioned members 227 that extend from a central rear portion 228. The central rear portion 228 has a notch 229 to provide additional access for removal of the label media 222 from the holder 223. The fifth multi-port station 230 has a front surface 232 with two pairs of horizontally arranged holes 234 with one pair sized and spaced to receive the pegs 128 of the first label implementation 110 and the other pair sized and spaced to receive the peg 128 of the second label implementation 220. The holes 234 are arranged for a horizontal orientation of the first label implementation 110 and the second label implementation 220 with respect to the fifth multi-port station 230. The fifth multi-port station 230 has a first horizontal row of two ports 236a and a second horizontal row of two ports 236b, each port shaped and sized to receive a connector, such as one of the connectors 136 or other connectors. The holes 234 are positioned to horizontally center the first label implementation 110 and the second label implementation 220 with respect to different pairs of the two ports 236a and the two ports 236b. The fifth multi-port station 230 also has openings 238 for mounting at the wall 199.

Figure 16:
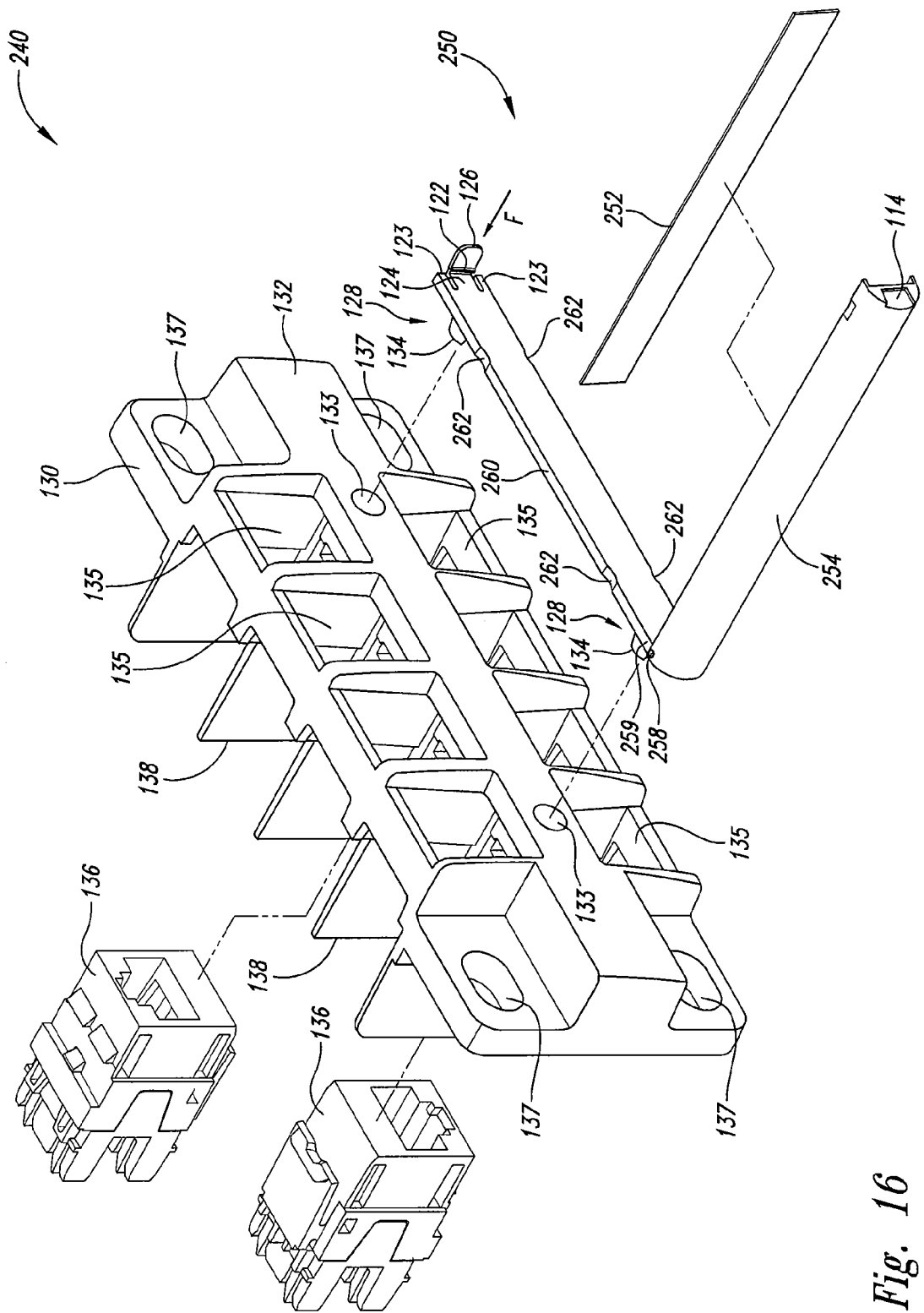
FIG. 16 is an exploded isometric front view of a seventh combination of a third label implementation and the first multi-port station of FIG. 1.
Figure 17:
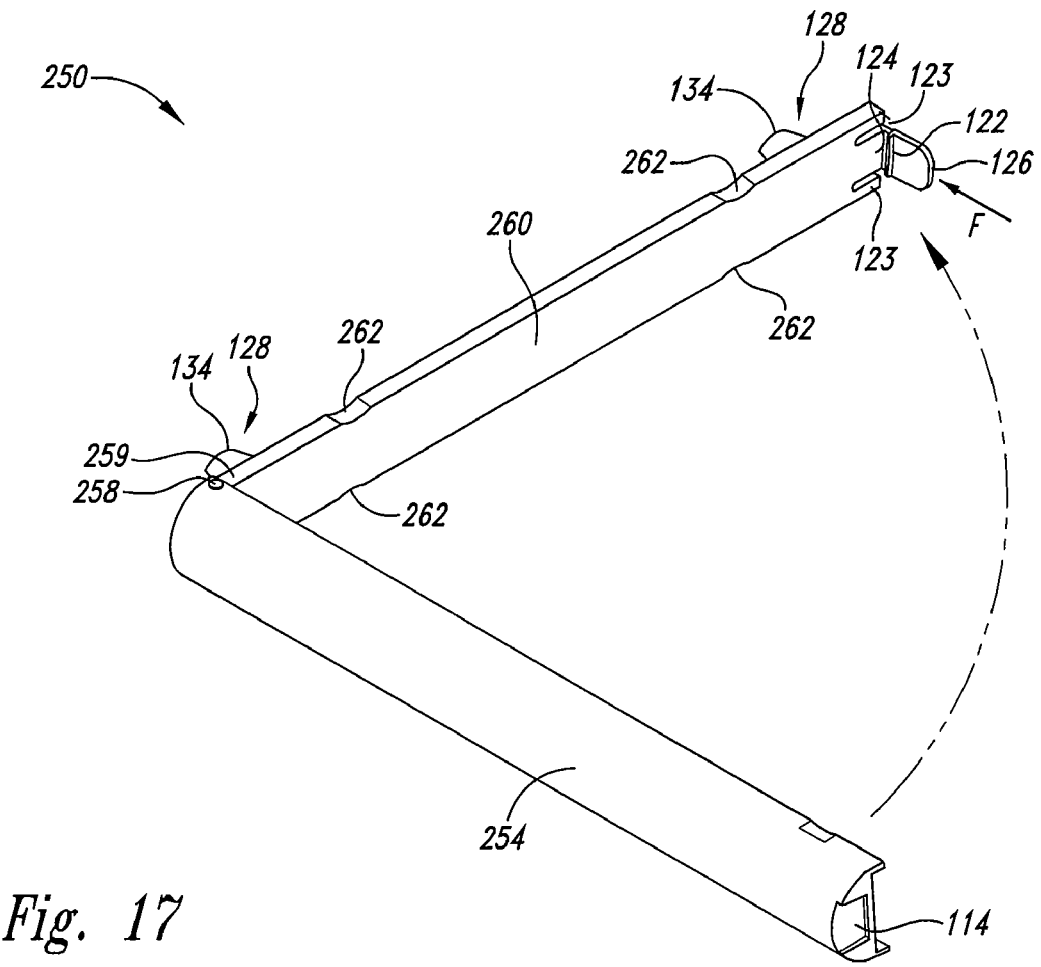
FIG. 17 is an isometric front view of the third label implementation of FIG. 16 in an open position.
Figure 18:
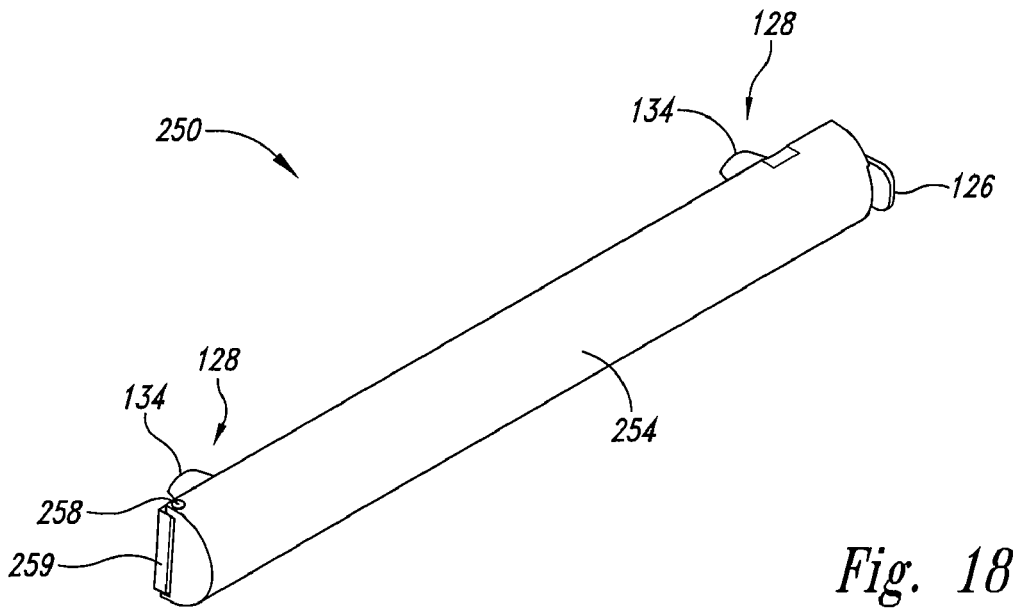
FIG. 18 is an isometric front view of the third label implementation of FIG. 16 in a closed position.
Figure 19:
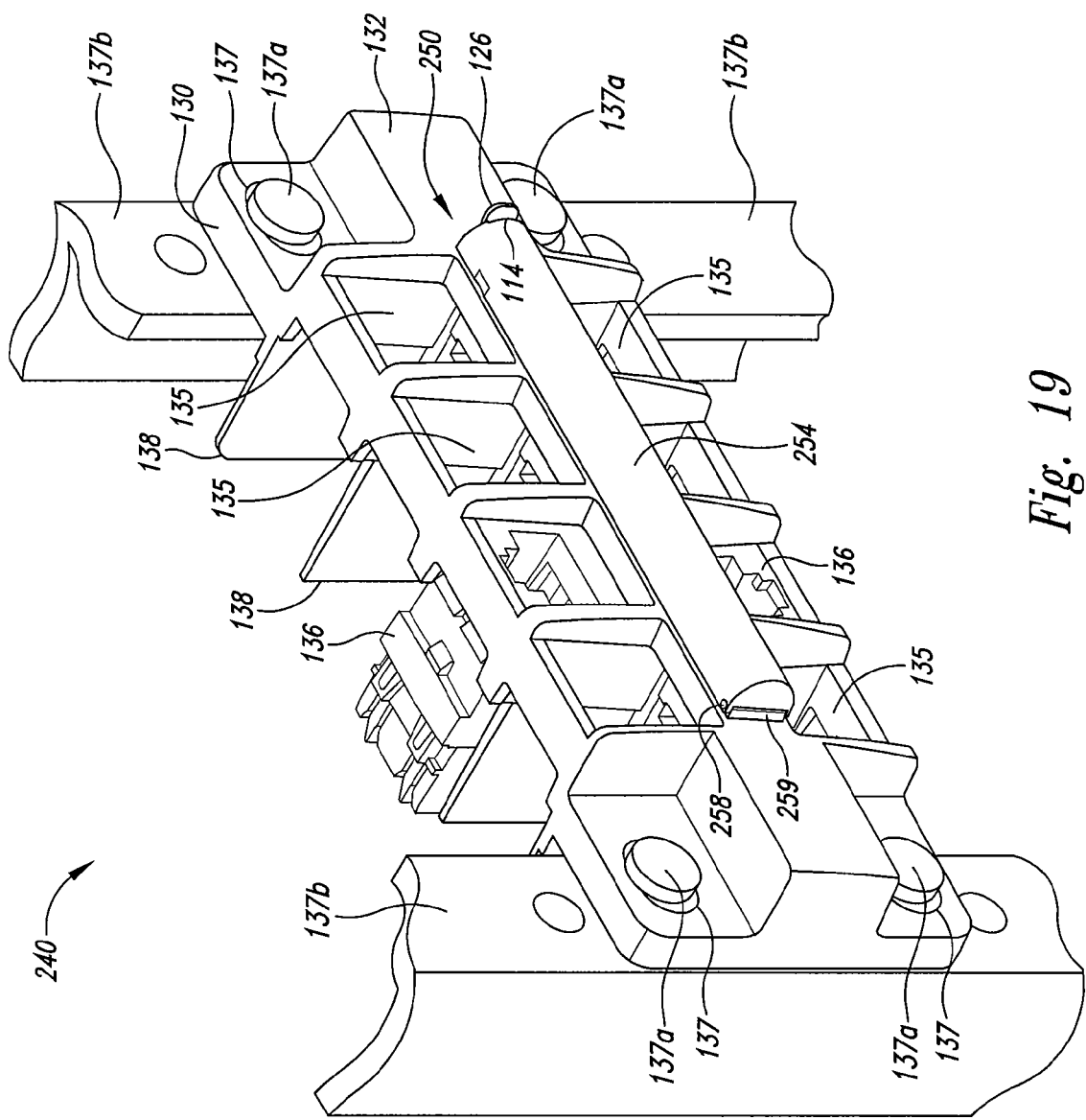
FIG. 19 is an isometric front view of the seventh combination of FIG. 16.

A seventh combination 240 is shown in FIG. 16 and FIG. 19 as having a third label implementation 250 (also shown in FIG. 17 and FIG. 18) and the first multi-port station 130. The third label implementation 250 has a label media 252 (such as a paper, card stock, plastic label or the like), and has an elongated transparent cover 254 sized to receive the label media therein. The cover 254 has one of the end-notches 114 at one end and is coupled by a hinge 258 on an other end 259 to a backing 260. The backing 260 has the second end-fastener 122 with the leaf spring portion 124 coupled to the push-tab 126. The one end-notch 114 receives and engages with the second end-fastener 122 when the cover 254 is moved to a closed position shown in FIG. 18. The backing 260 has notches 262 to provide clearance for tabs (not shown but similar to tabs 286 shown in FIG. 20) in the cover 254 when in the closed position. The tabs are used to help secure the label media 252 within the cover 254.

Figure 20:
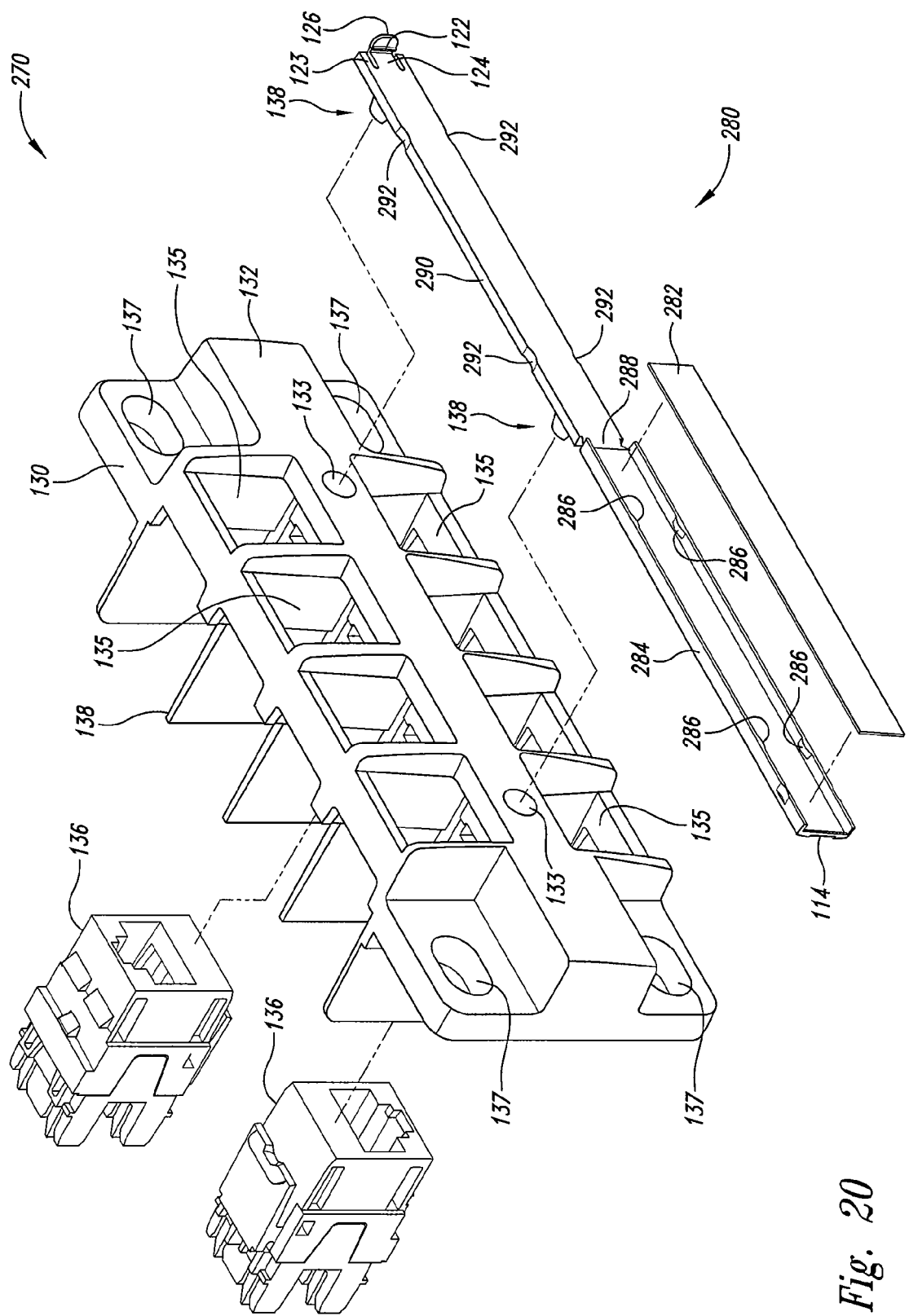
FIG. 20 is an exploded isometric front view of an eighth combination a fourth label implementation and the first multi-port station of FIG. 1.
Figure 23:
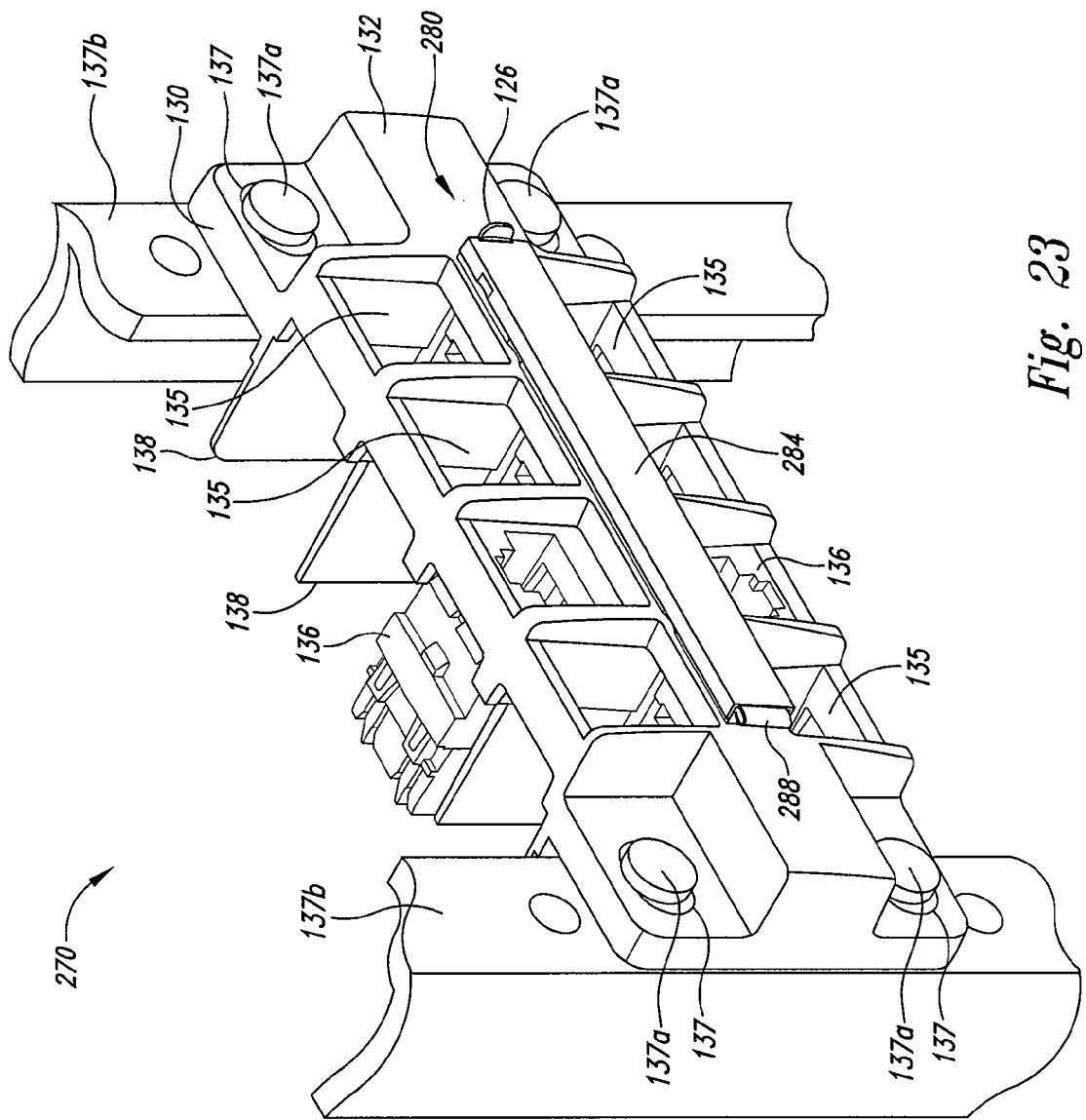
FIG. 23 is an isometric front view of the eighth combination of FIG. 20.

An eighth combination 270 is shown in FIG. 20 and FIG. 23 as having a fourth label implementation 280 (also shown in FIG. 21 and FIG. 22) and the first multi-port station 130. The fourth label implementation 280 has a label media 282 (such as a paper, card stock, plastic label or the like), and has an elongated transparent cover 284 sized to receive the label media therein. The transparent cover 284 has one of the end-notches 114 at one end and has tabs 286 to help secure the label media 282 inside the cover 284. The cover 284 has a single-piece hinge 288 on an other end coupling the cover to a backing 290. The backing 290 has the second end-fastener 122 with the leaf spring portion 124 coupled to the push-tab 126. The one end-notch 114 receives and engages with the second end-fastener 122 when the cover 284 is moved to a closed position shown in FIG. 22. The backing 290 has notches 292 to provide clearance for the tabs 286 when the cover 284 is in the closed position.

Figure 24:
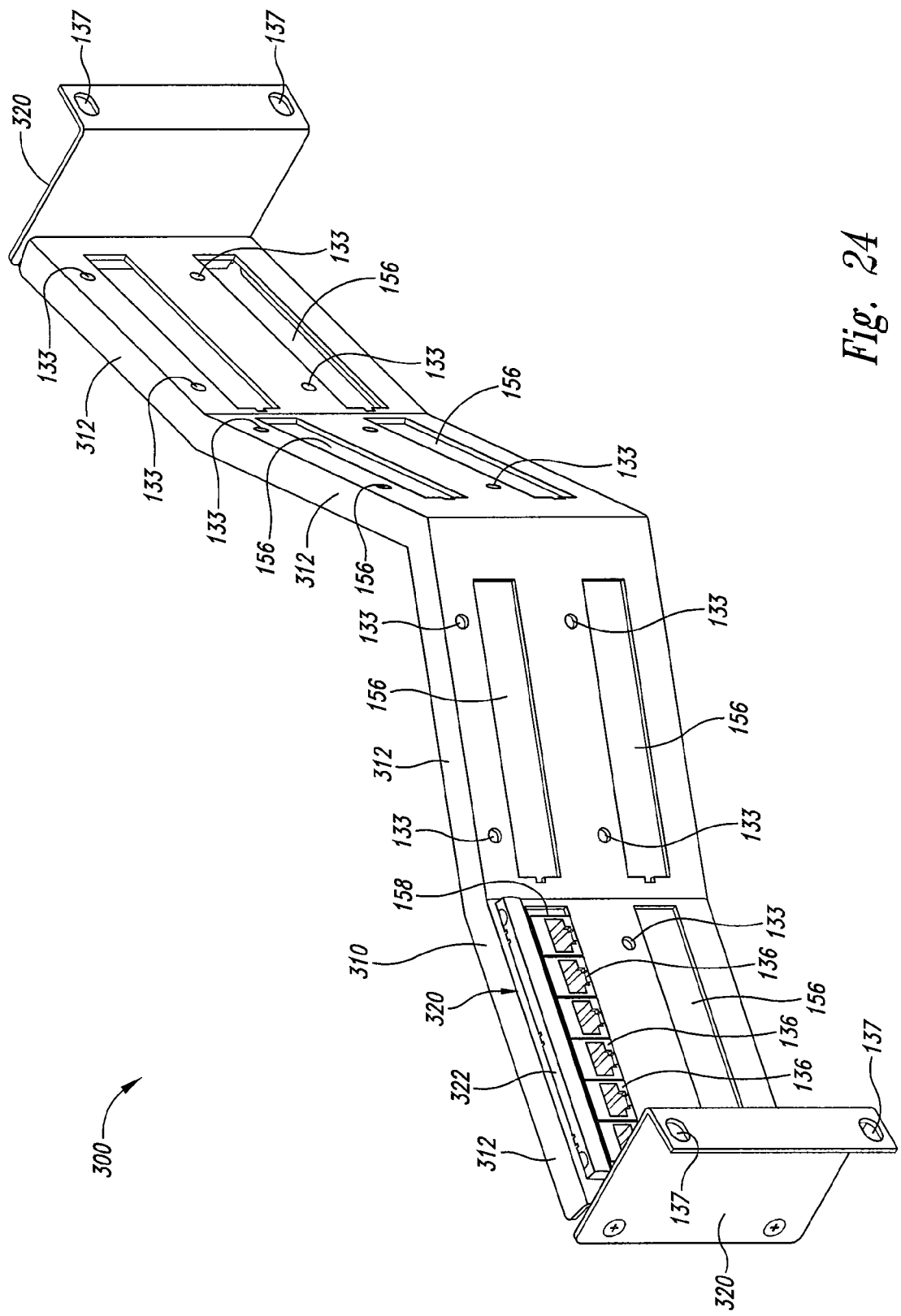
FIG. 24 is an isometric front view of a ninth combination of a fifth label implementation and a sixth multi-port station.

A ninth combination 300 is shown in FIG. 24 as having a sixth multi-port station 310 and a fifth label implementation 320. The sixth multi-port station 310 has four angled sections 312, each having the port bays 156 to receive the connector sets 158 and the holes 133 to receive the pegs 128 of the fifth label implementation 320. The sixth multi-port station 310 also has side extension members 320 for recessed positioning of the sixth multi-port station when secured in an equipment rack.

Figure 27:
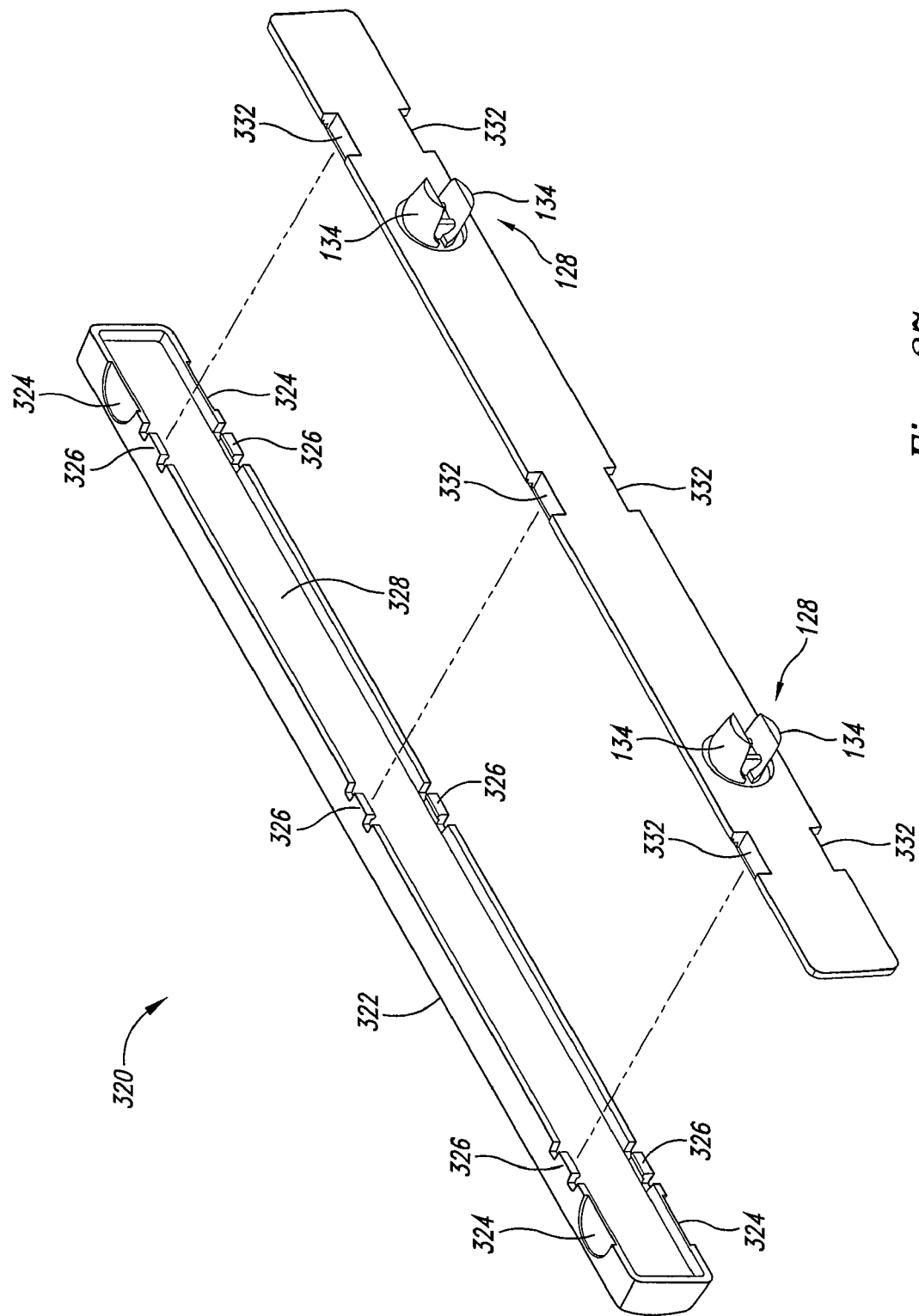
FIG. 27 is an exploded isometric rear view of the fifth label implementation of FIG. 24.

The fifth label implementation 320 is shown in FIG. 25, FIG. 26 and FIG. 27 as having an elongated transparent cover 322 with recessed grip areas 324 toward both ends. The cover 322 has clips 326 to receive a label media 328 and to engage with a backing 330 having notches 332 that receive the clips to secure the cover with the backing.

Figure 28:
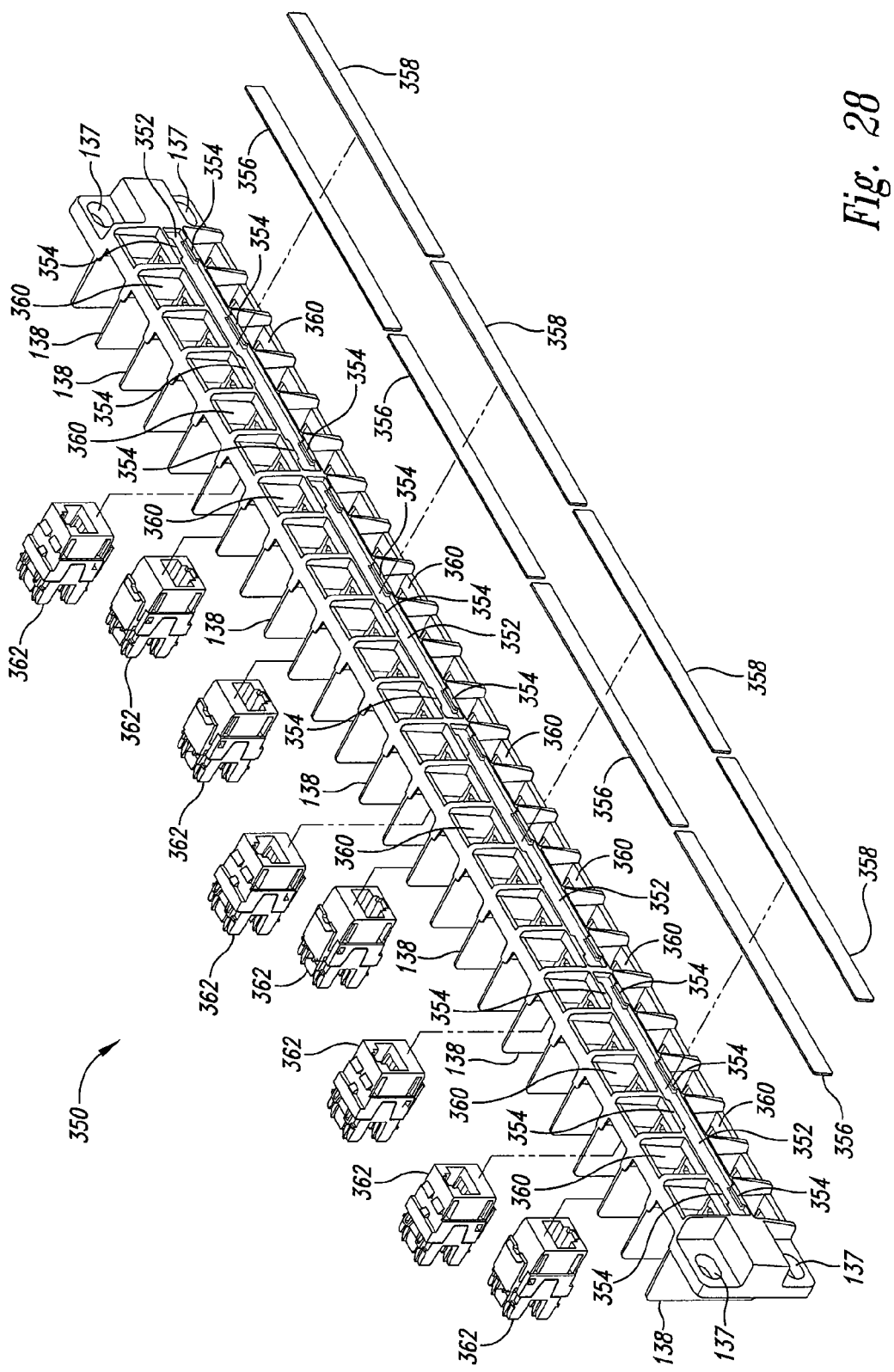
FIG. 28 is an exploded isometric front view of a tenth combination of a sixth label implementation and a seventh multi-port station.
Figure 29:
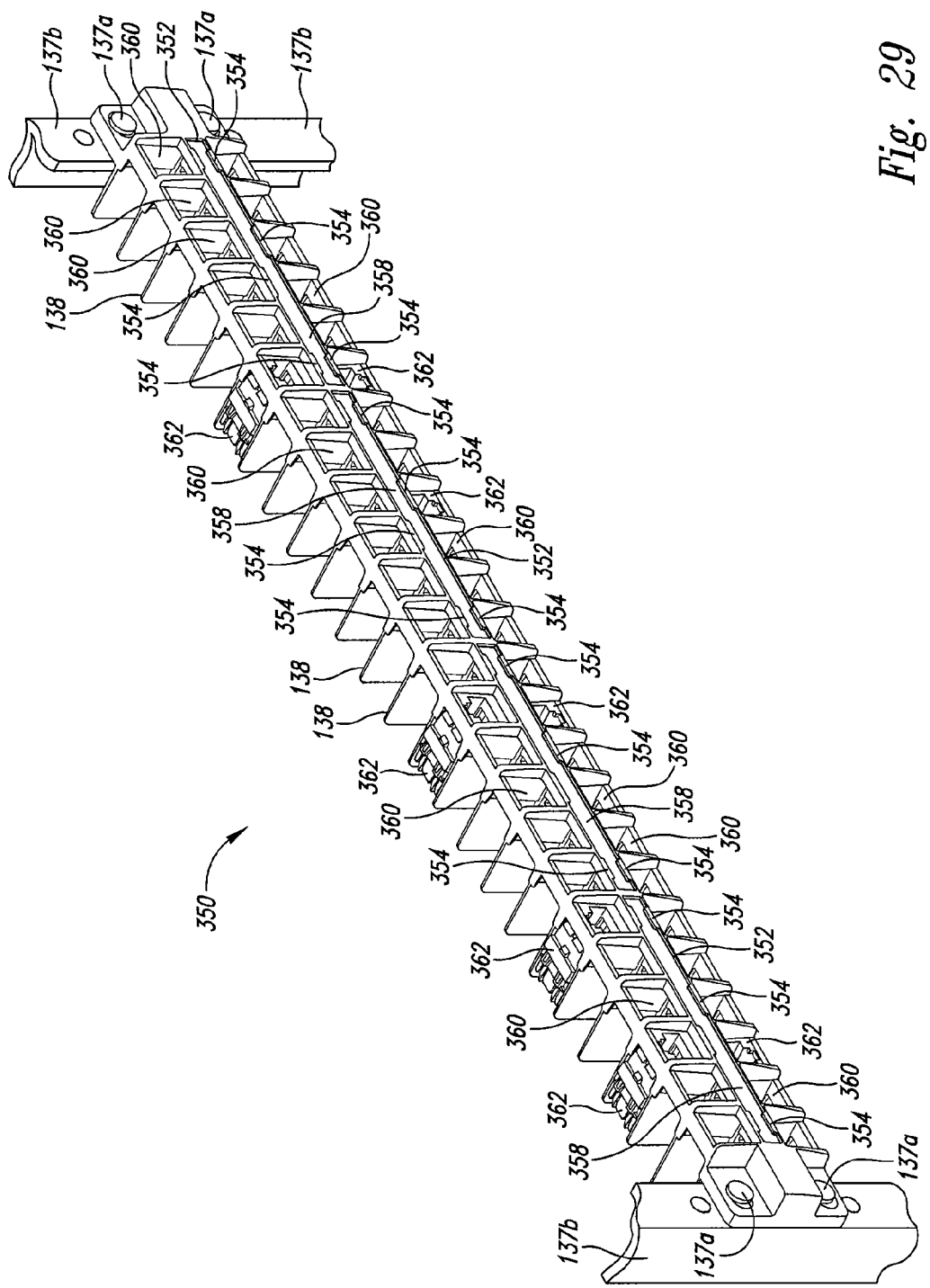
FIG. 29 is an isometric front view of the tenth combination of FIG. 28.

A tenth combination of a seventh multi-port station 350 and a sixth label implementation is shown in FIG. 28 and FIG. 29. The seventh multi-port station 250 has a mid-positioned elongated channel 352 with a series of tabs 354 to receive and secure a plurality of label media 356 and a corresponding plurality of transparent covers 358. The seventh multi-port station 350 has two rows of ports 360, one above and one below the elongated channel 352. The ports 360 are positioned and shaped to receive connectors 362 that are isolated from one another by the shields 138.

Figure 30:
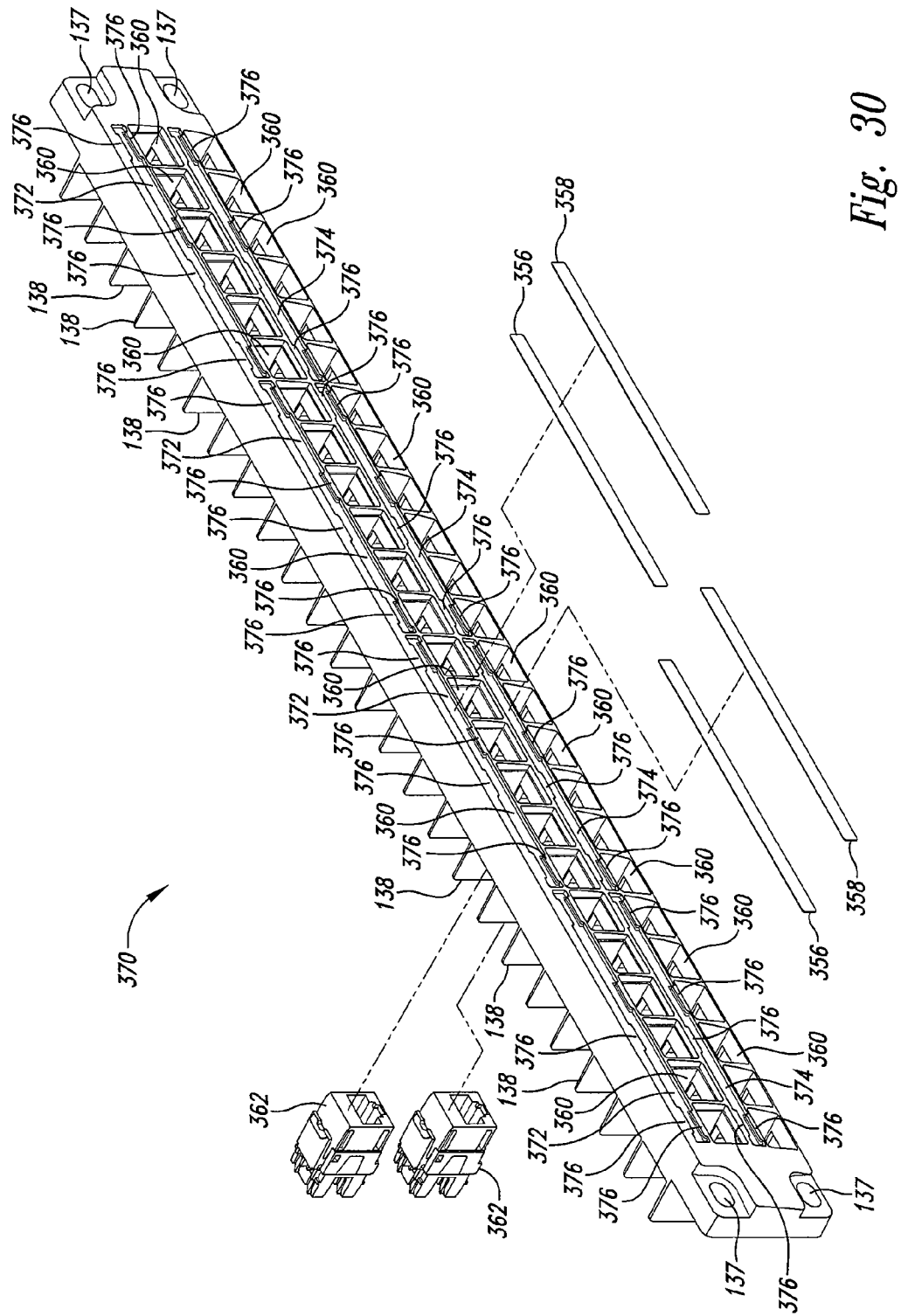
FIG. 30 is an exploded isometric front view of an eleventh combination of a seventh label implementation and an eighth multi-port station.
Figure 31:
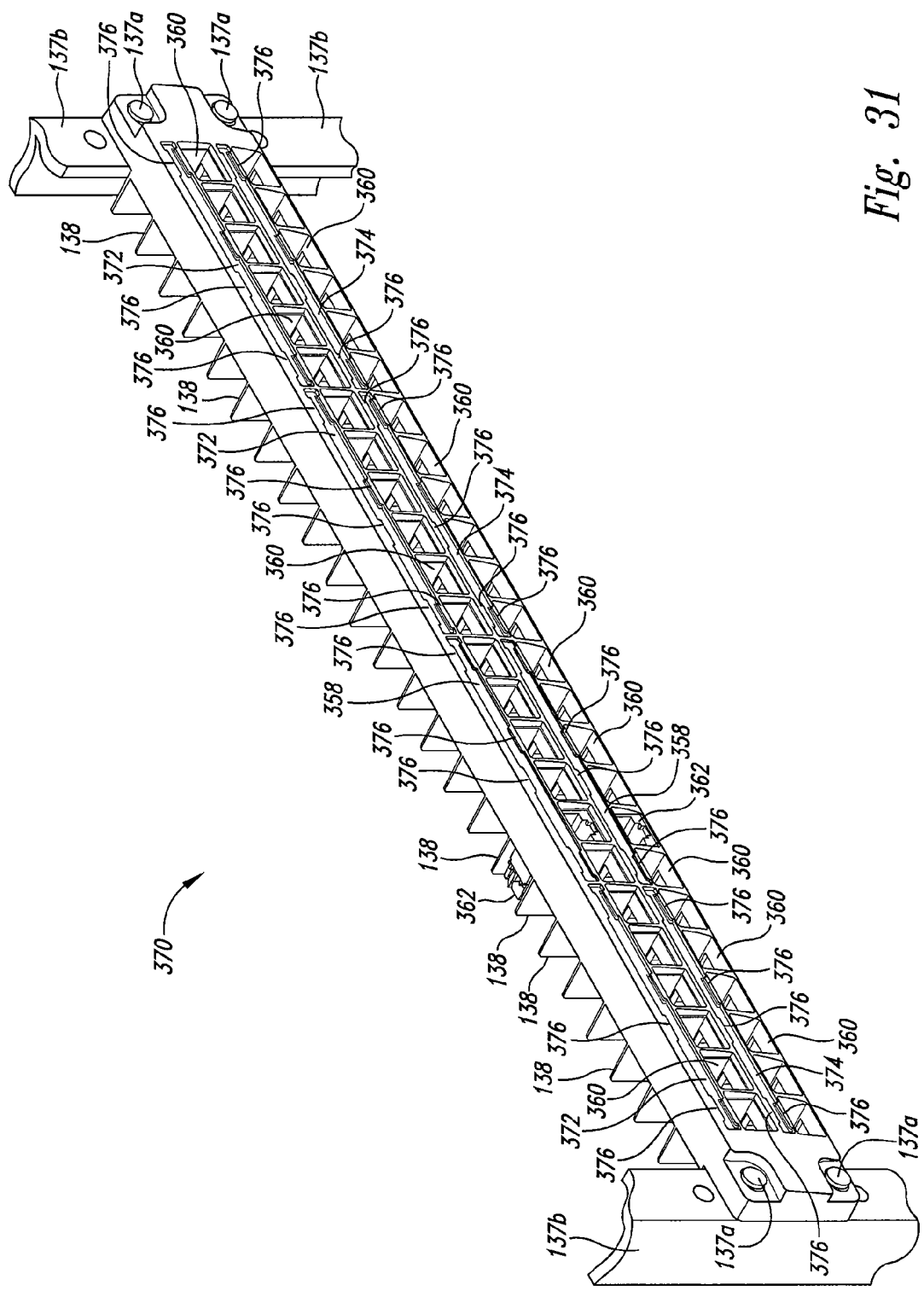
FIG. 31 is an isometric front view of the eleventh combination of FIG. 30.

An eleventh combination of an eighth multi-port station 370 and a seventh label implementation is shown in FIG. 30 and FIG. 31. The eighth multi-port station 370 has an upper channel 372 and a lower channel 374, each having a series of tabs 376 to receive and secure a plurality of label media 378 and corresponding plurality of transparent covers 380. The eighth multi-port station 370 has two rows of the ports 360, with the upper channel 372 serving identification purposes for the upper row of the ports and the lower channel 374 serving identification purposes for the lower row of the ports.

Figure 32:
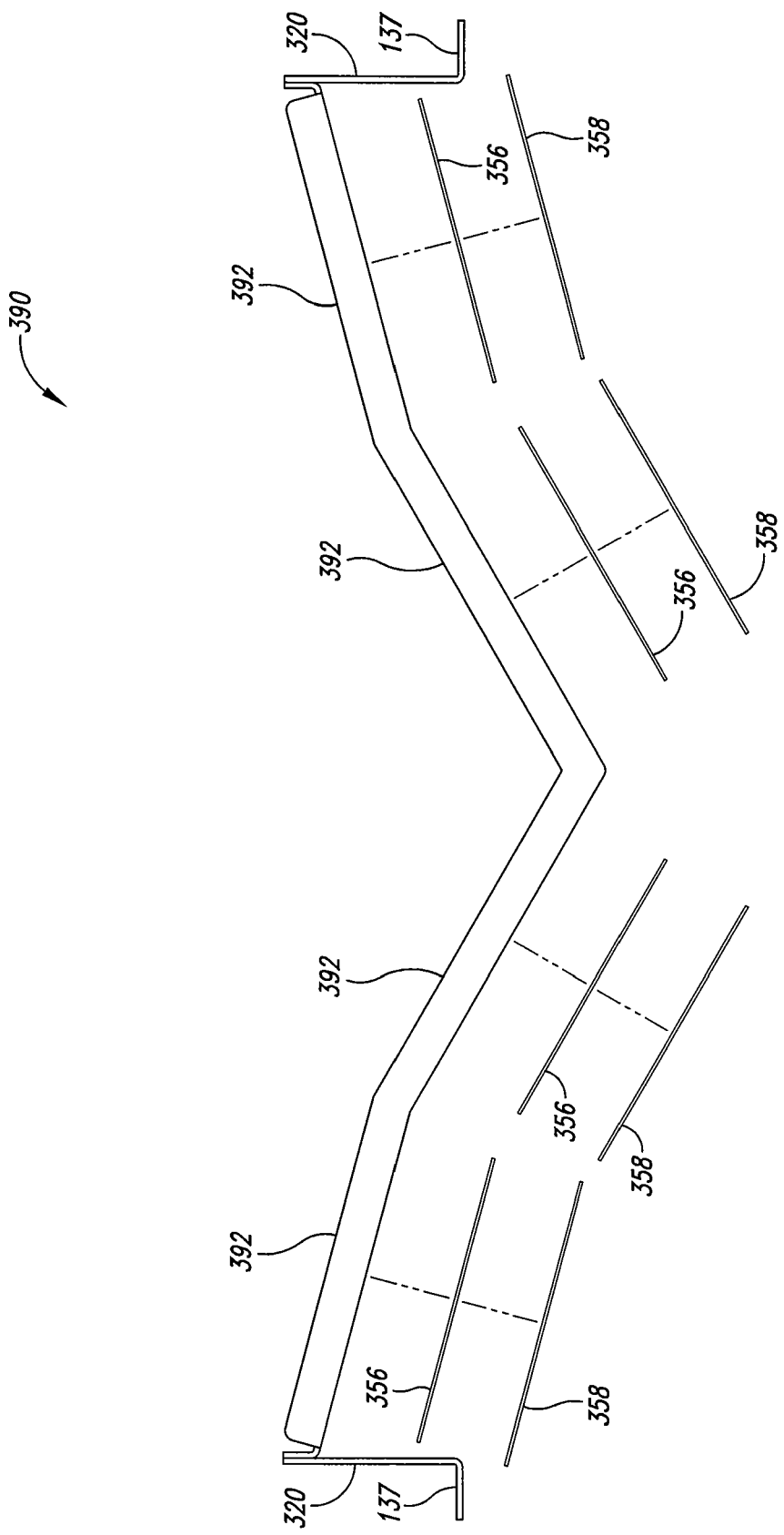
FIG. 32 is a top view of a twelfth combination of an eighth label implementation and a ninth multi-port station.

A twelfth combination of a multi-port station 390 and an eighth label implementation is shown in FIG. 32. The ninth multi-port station 390 has four angled sections 392 as in the sixth multi-port station 310 of FIG. 24, with each angled section receiving the label media 356 and the transparent cover 358.

Figure 33:
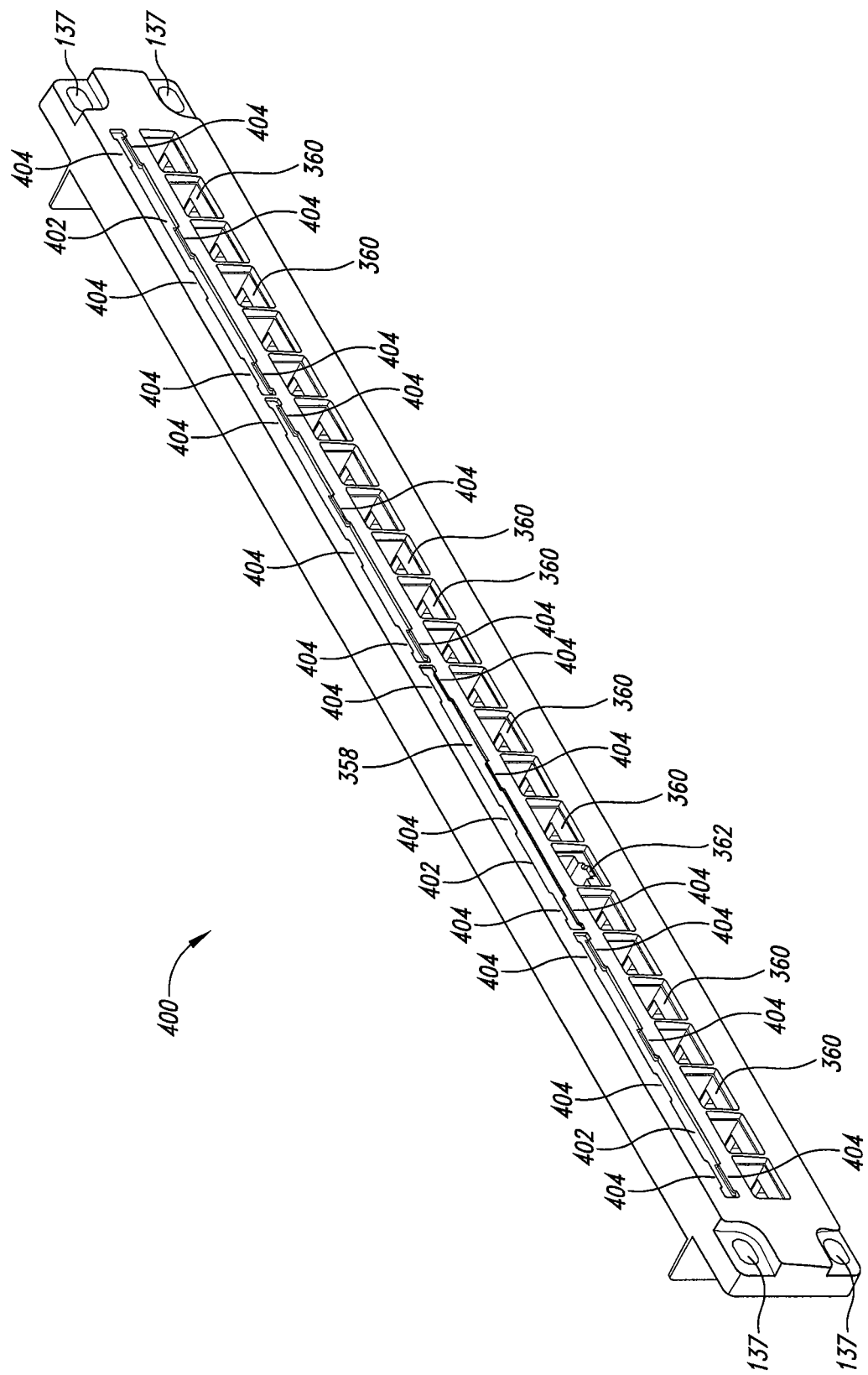
FIG. 33 is an isometric front view of a thirteenth combination of a ninth label implementation and a tenth multi-port station.

A thirteenth combination of a tenth multi-port station 400 and a ninth label implementation is shown in FIG. 33. The tenth multi-port station 400 has a single channel 402 with tabs 404 to retain and secure the label media 356 and the transparent covers 358. The single channel 402 is positioned above a single row of the ports 360.

Figure 34:
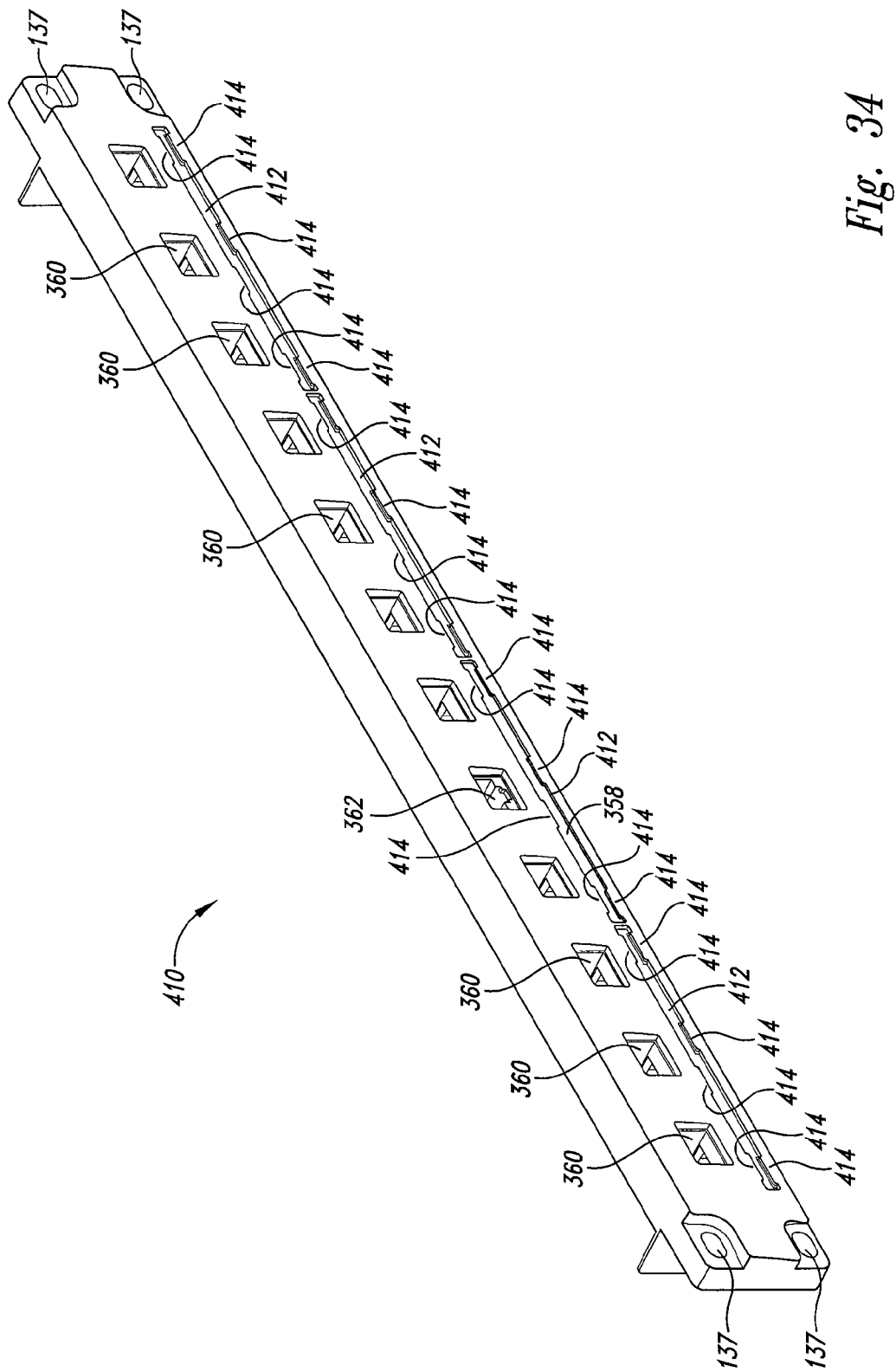
FIG. 34 is an isometric front view of a fourteenth combination of a tenth label implementation and an eleventh multi-port station.

A fourteenth combination of an eleventh multi-port station 410 and a tenth label implementation is shown in FIG. 34. The eleventh multi-port station 410 has a single channel 412 with tabs 414 to retain and secure the label media 356 and the transparent covers 358. The single channel 412 is positioned below a single row of the ports 360.

Figure 35:
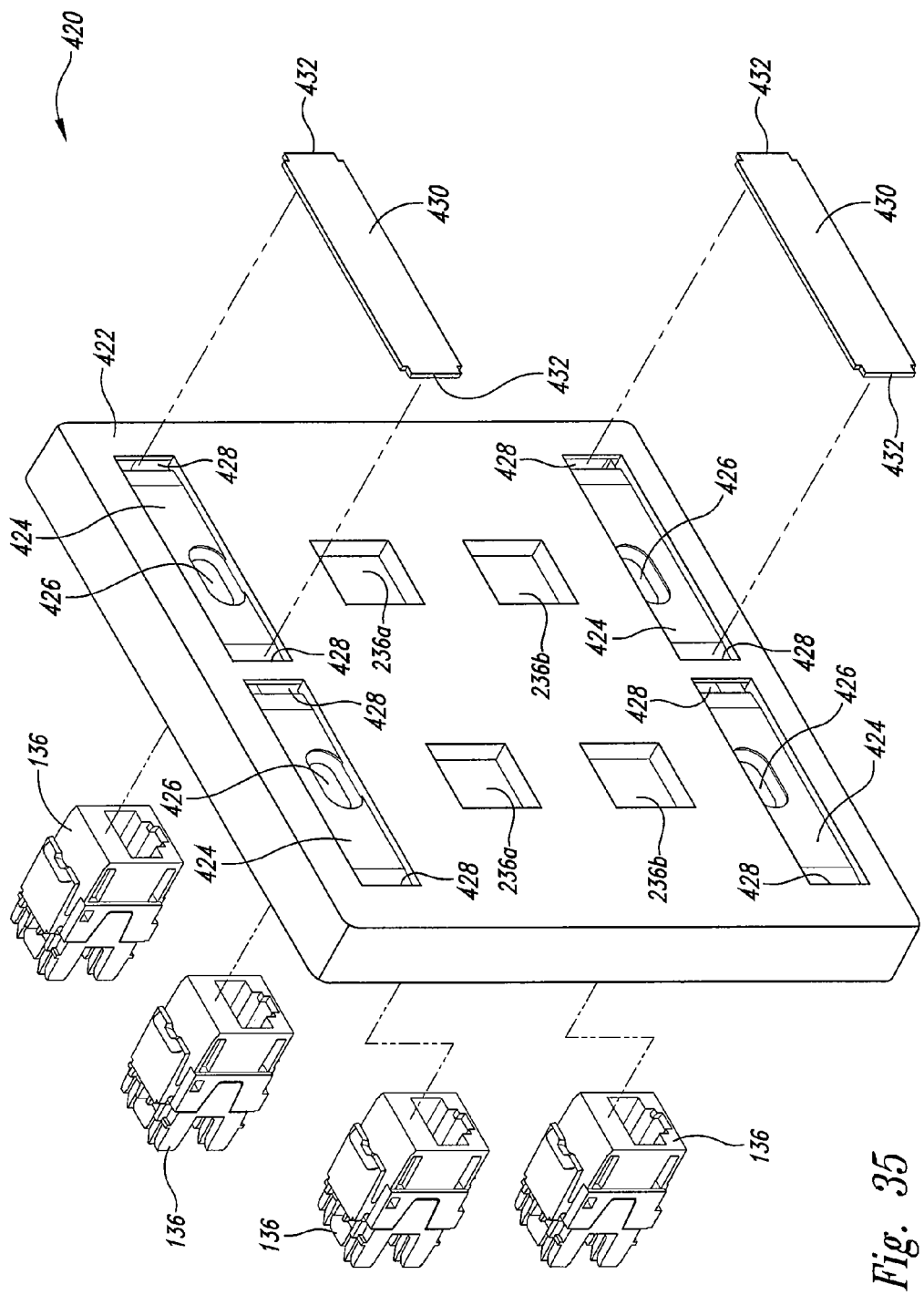
FIG. 35 is an exploded isometric front view of a fifteenth combination of an eleventh label implementation and a twelfth multi-port station.
Figure 36:
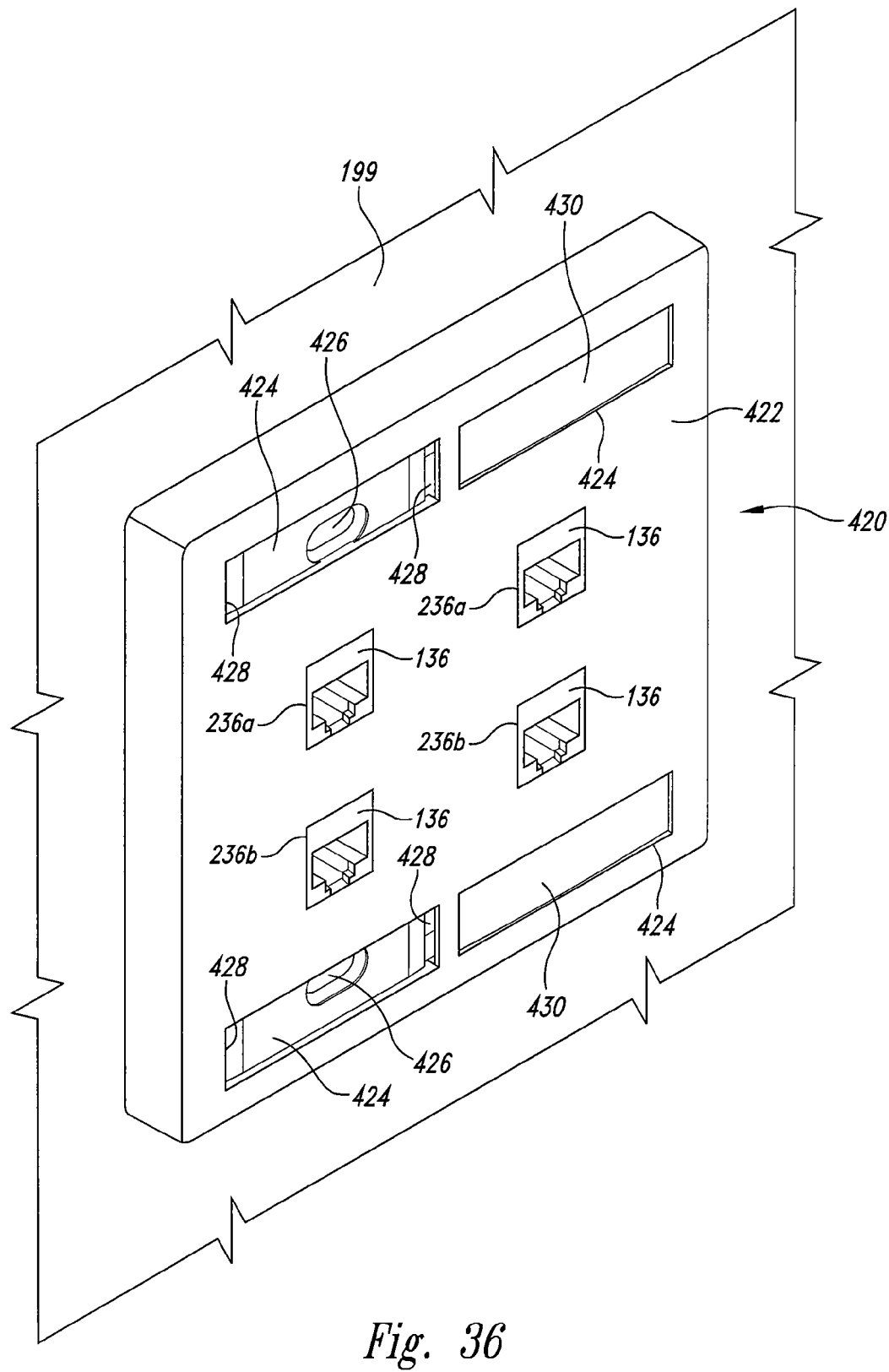
FIG. 36 is an isometric front view of the fifteenth combination of FIG. 35.

A fifteenth combination of a twelfth multi-port station 420 and an eleventh label implementation is shown in FIG. 35 and FIG. 36. The twelfth multi-port station 420 has a front wall plate 422 with elongated recesses 424 and openings 426. The recesses 424 include end-notches 428. The recesses 424 are shaped to receive label media 430 having end-tabs 432 that engage with the end-notches 428 of the recesses. In the implementation shown, two of the recesses 424 are positioned above the first horizontal row of two ports 236a and two of the recesses are positioned below the second horizontal row of two ports 236b.

Figure 37:
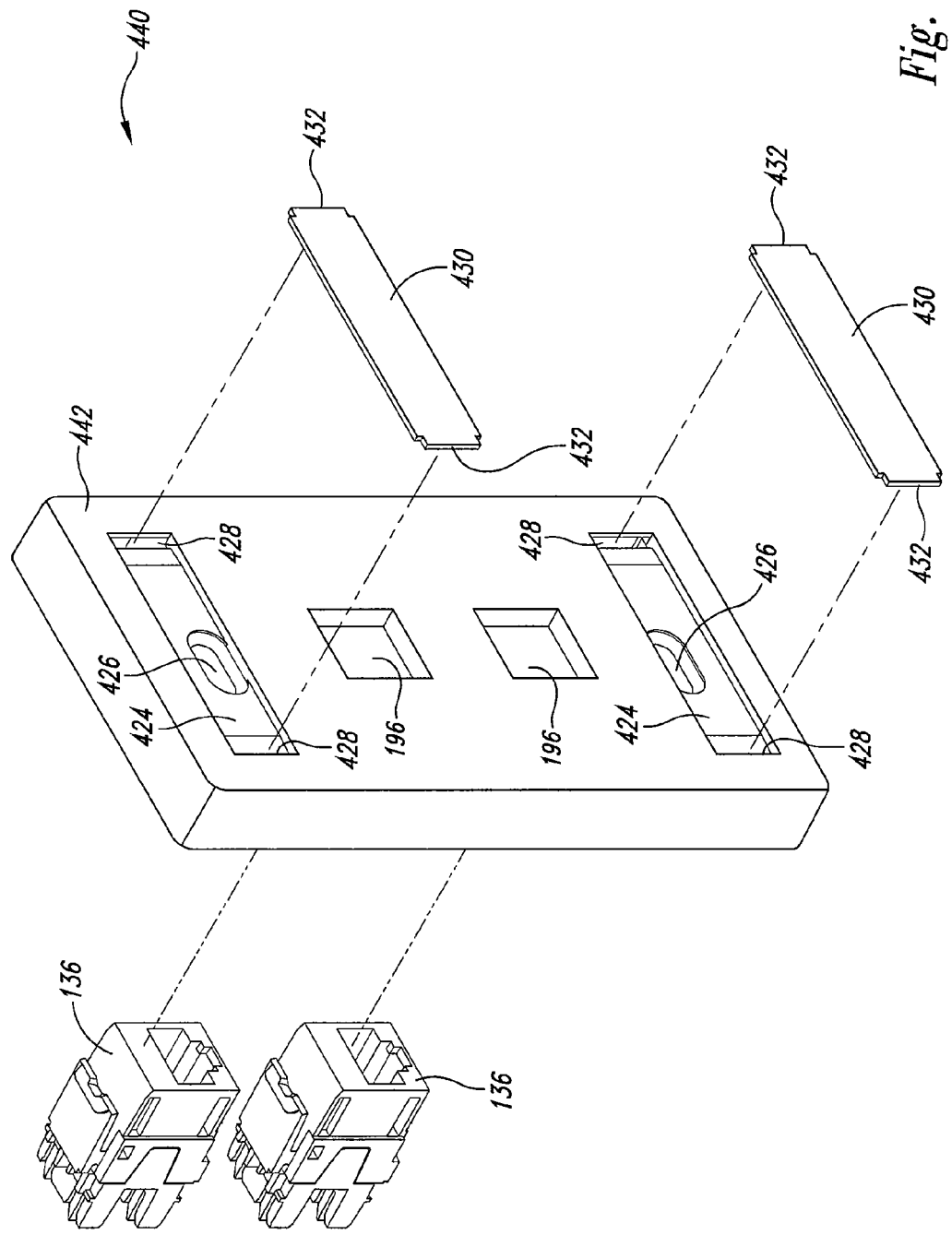
FIG. 37 is an exploded isometric front view of a sixteenth combination of a twelfth label implementation and a thirteenth multi-port station.
Figure 38:
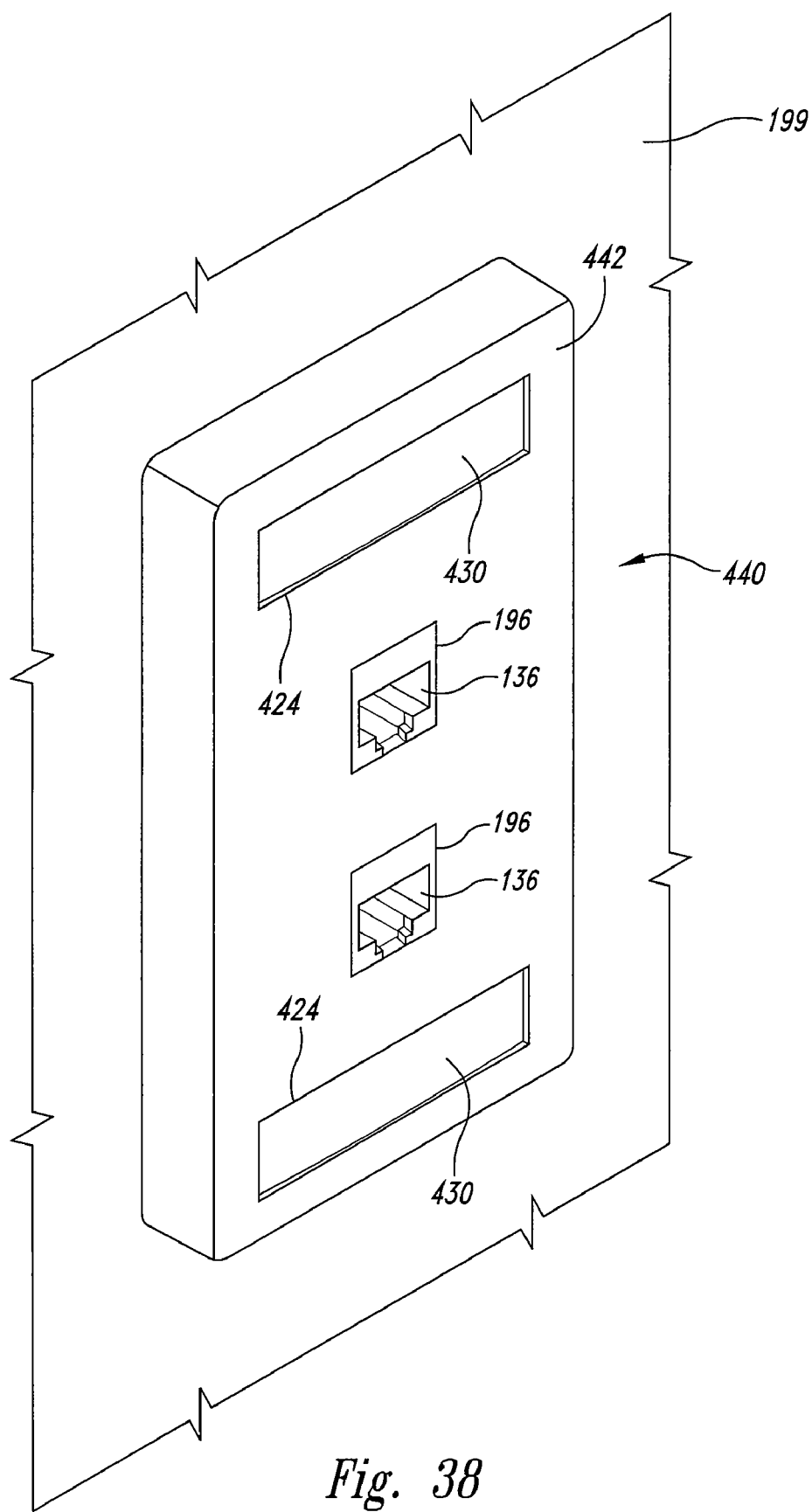
FIG. 38 is an isometric front view of the sixteenth combination of FIG. 37.

A sixteenth combination of a thirteenth multi-port station 440 and a twelfth label implementation is shown in FIG. 37 and FIG. 38. The thirteenth multi-port station 440 has only two of the ports 196 and two of the recesses 424, but is otherwise similar to the twelfth multi-port station 420 of FIGS. 35 and 36. For the thirteenth multi-port station 440, one of the two recesses 424 is positioned above the upper one of the ports 196 and the other of the two recesses 424 is positioned below the lower one of the ports.

Figure 39:
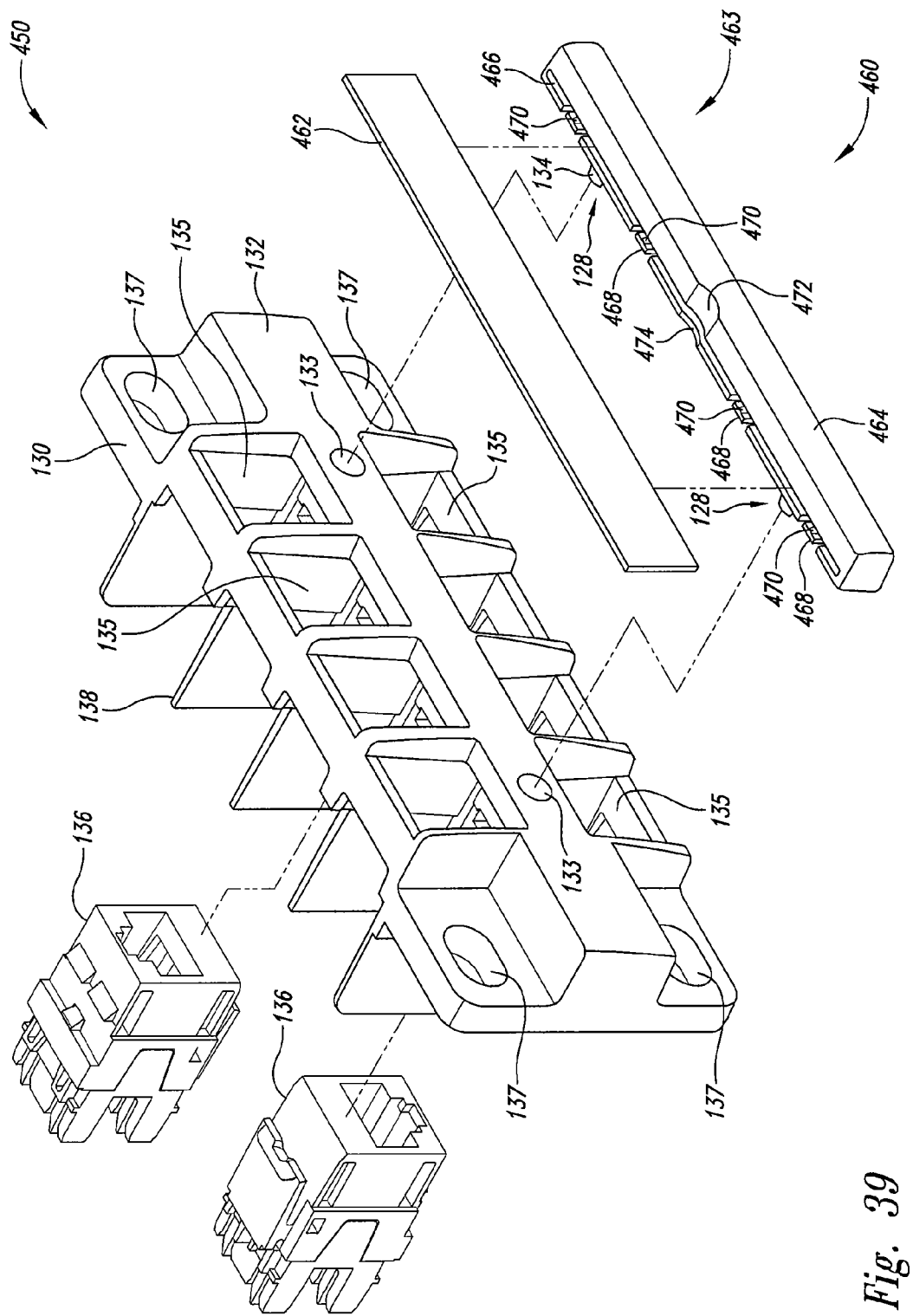
FIG. 39 is an exploded isometric front view of a seventeenth combination of a thirteenth label implementation and the first multi-port station of FIG. 1.
Figure 40:
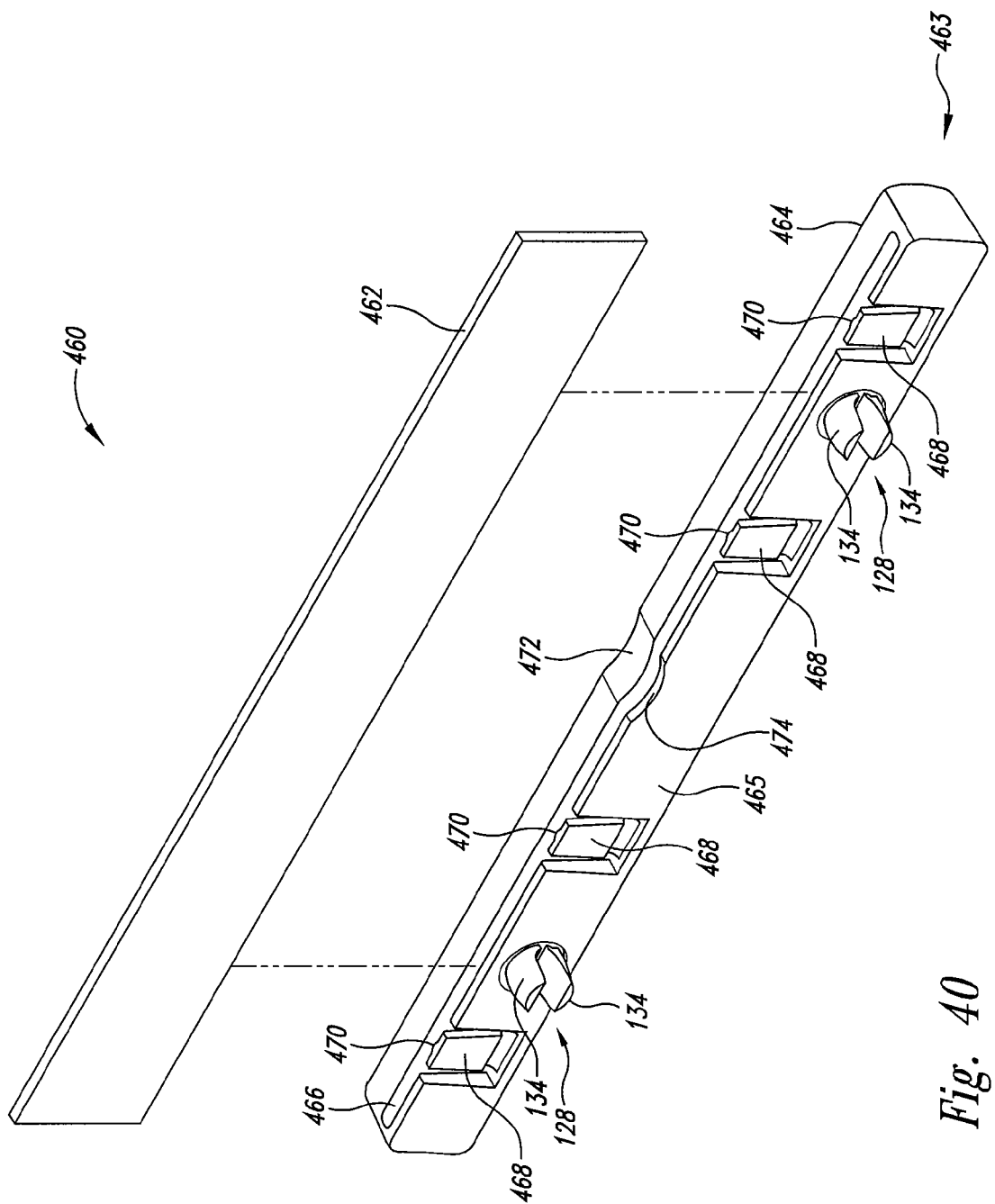
FIG. 40 is an exploded isometric rear view of the seventeenth label implementation of FIG. 39.
Figure 41:
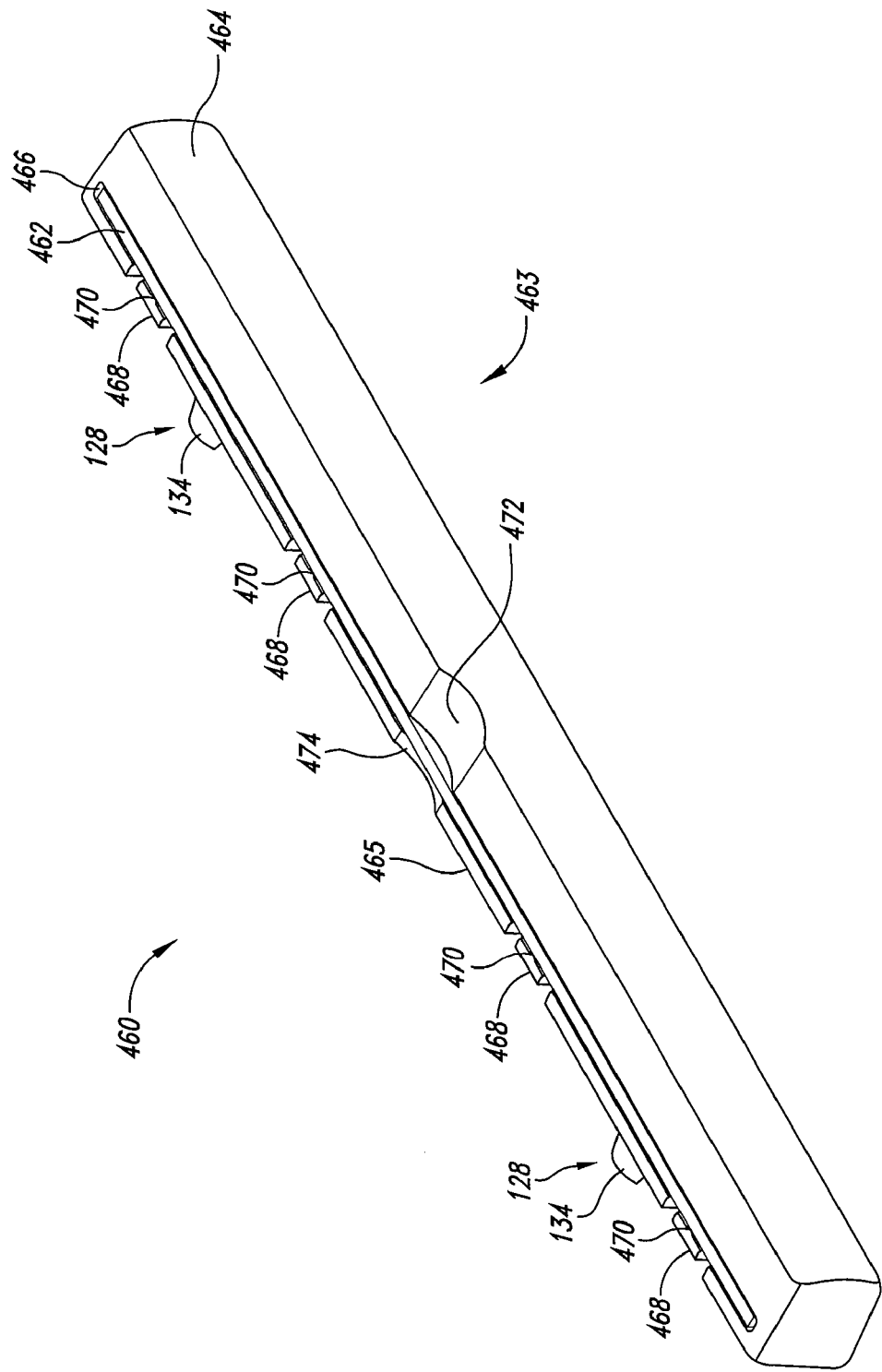
FIG. 41 is an isometric front view of the seventeenth label implementation of FIG. 39.
Figure 42:
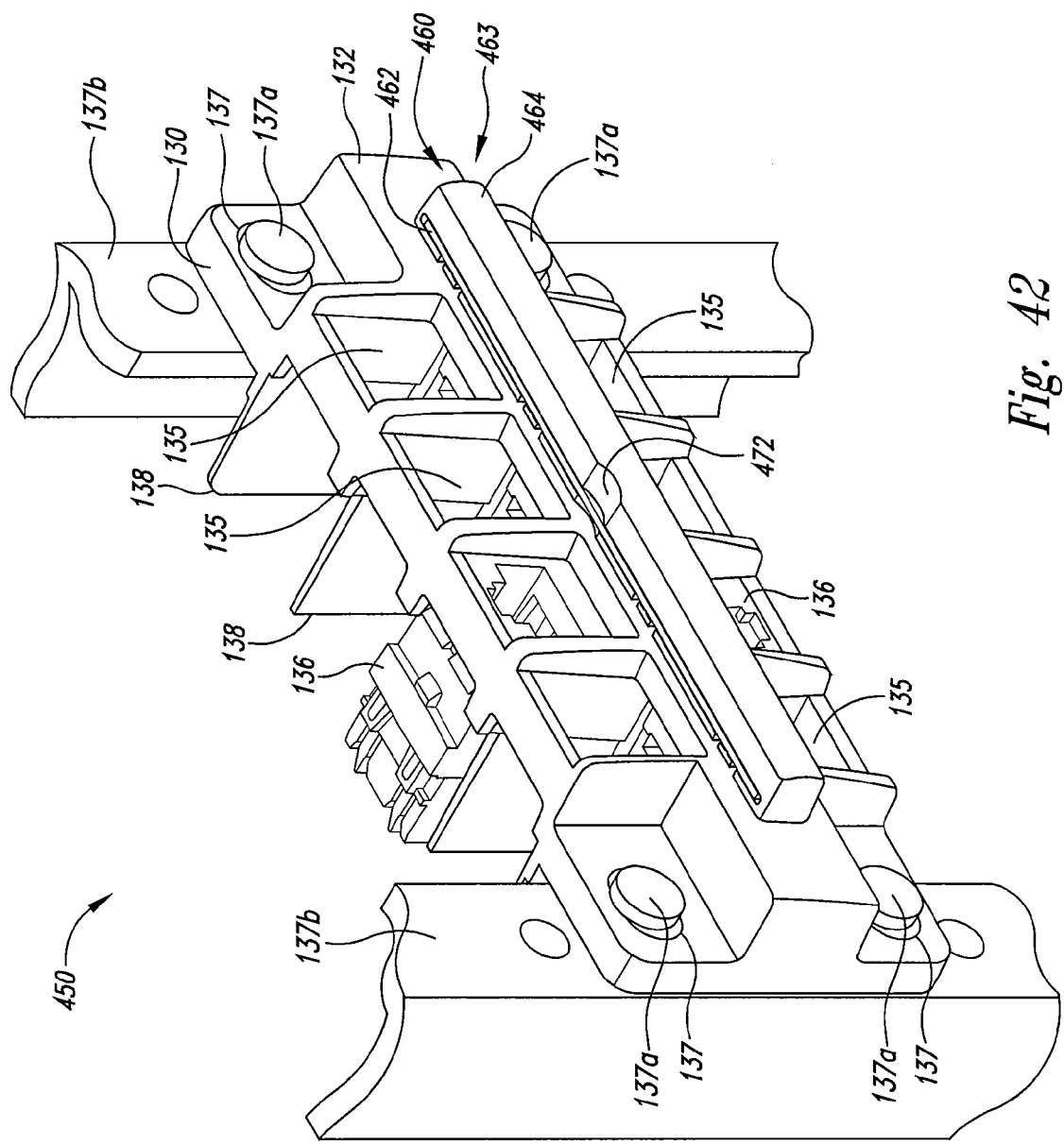
FIG. 42 is an isometric front view of the seventeenth combination of FIG. 39.

A seventeenth combination 450 of the first multi-port station 130 and a thirteenth label implementation 460 is shown in FIG. 39 and FIG. 42. The thirteenth label implementation 460 includes label media 462 and a holder 463, as further shown in FIG. 40 and FIG. 41, having a transparent cover portion 464, a rear portion 465, and a slot 466 therebetween. The label media 462 is received into the slot 466 of the holder 463. The holder 463 further includes tensioned members 468 with contact portions 470 that help to retain the label media 462 in the slot 466. A notch 472 in the cover portion 464 and a notch in the rear portion 465 provides additional access for removal of the label media 462 from the holder 463.

From the foregoing it will be appreciated that, although specific embodiments of the invention have been described herein for purposes of illustration, various modifications may be made without deviating from the spirit and scope of the invention. Accordingly, the invention is not limited except as by the appended claims.

The invention claimed is:

1. For a multi-port station, a system comprising:
   a label media; and
   a label holder comprising:
   an upwardly opening upper edge portions;
   a rear portion configured to engage with the multi-port station;
   a cover portion; and
   a slot defined between the rear portion and the cover portion, the upwardly opening upper edge portion being positioned to receive the label media into the slot, the label media being viewable from outside the label holder through the cover portion when in the slot.

2. The system of claim 1 wherein the rear portion includes pegs for engagement with the multi-port station.

3. The system of claim 1 for a multi-port station having a first row of ports and a second row of ports, the rear portion being configured to engage with the multi-port station to position the rear portion in relation to at least one of the first row of ports and the second row of ports.

4. The system of claim 3 wherein the rear portion is configured to engage with the multi-port station to position the rear portion between the first row and the second row of ports.

5. The system of claim 3 wherein the rear portion is configured to engage with the multi-port station to position the rear portion above the first row of ports.

6. The system of claim 3 wherein the rear portion is configured to engage with the multi-port station to position the rear portion below the second row of ports.

7. The system of claim 1 for a multi-port station having a first row of ports, the rear portion configured to engage with the multi-port station to position the rear portion in relation to the first row of ports.

8. The system of claim 1 wherein the cover portion includes a lens.

9. The system of claim 1 wherein the cover portion is transparent.

10. The labeling system of claim 1 wherein the label media is one of the following: a piece of paper, a card stock, and a piece of plastic.

11. A system comprising:
   a multi-port station;
   a label media; and
   a label holder comprising:
   a backing portion configured to engage with the multi-port station;
   a cover portion; and
   a slot defined between the backing portion and the cover portion, the slot having an upwardly opening upper edge portion configured to receive the label media into the slot.

12. The system of claim 11 wherein the multi-port station is configured for engagement with a rack.

13. For a multi-port station, a system comprising:
   a label media with information on the label media; and
   a label holder comprising:
   a rear facing portion couplable to the multi-port system,
   a front facing lens portion opposite the rear facing portion, and
   a slot located behind the front facing lens portion and in front of the rear facing portion, the slot having an upwardly opening upper edge portion configured to receive the label media with its information facing forward, the front facing lens portion being configured to magnify at least a portion of the forward facing information on the label media to produce a magnified visual presentation of the portion of the information on the label media viewable from outside the label holder.

14. The system of claim 13 wherein the information on the label media includes alpha-numeric characters.

15. For a multi-port station having ports, a method comprising:
   selecting a coupling location for a label holder with respect to at least a portion of the ports, the label holder comprising a connector portion, a cover portion with a magnifying lens formed therein, and a slot defined between the connector portion and the cover portion, the slot having an upwardly opening upper edge portion defined between the connector portion and the cover portion;
   inserting a label media having information on the label media inside the slot of the label holder through the upwardly opening upper edge portion of the slot with the information facing toward the cover portion, the magnifying lens formed therein magnifying at least a portion of the information on the label media; and
   coupling the connector portion of the label holder to the multi-port station thereby attaching the label media to the multi-port station.

16. The method of claim 15, wherein the connector portion of the label holder further comprises a notch in communication with the upwardly opening upper edge portion of the slot,
   after the label media is inserted into the slot, an accessible portion of the label media is disposed inside the notch, and
   the method further comprises grasping the accessible portion of the label media and removing the label media from the slot of the label holder through the upwardly opening upper edge portion of the slot.

17. The method of claim 15 for use with a multi-port station having a plurality of holes, wherein the connector portion of the label holder comprises a plurality of pegs receivable inside the plurality of holes of the multi-port station, and
   coupling the connector portion of the label holder to the multi-port station comprises inserting the plurality of pegs inside the plurality of holes of the multi-port station.

18. The method of claim 17 wherein each of the plurality of pegs is inserted into one of the plurality of holes and comprises split portions configured to maintain the peg inside one of the plurality of holes.

19. The system of claim 1, further comprising:
   a tensioned member having a contact portion configured to be in contact with a portion of the label media when the label media is received inside the slot.

20. The system of claim 1, further comprising:
   a notch formed in the upper edge portion of the label holder, a portion of the label media being inside the notch when the label media is received inside the slot, the portion of the label media inside the notch being accessible from outside the slot.

21. The system of claim 1 for use with a multi-port station having a plurality of holes, wherein the rear portion of the label holder comprises a plurality of pegs receivable inside the plurality of holes of the multi-port station, and
   the rear portion of the label holder is configured to engage with the multi-port station by inserting of the plurality of pegs inside the plurality of holes of the multi-port station.

22. The system of claim 21 wherein each of the plurality of pegs is inserted into one of the plurality of holes and comprises split portions configured to maintain the peg inside one of the plurality of holes.

23. The system of claim 11, wherein the backing portion further comprises a tensioned member having a contact portion configured to be in contact with a portion of the label media when the label media is received into the slot.

24. The system of claim 11, further comprising:
 a notch formed in the label holder, a portion of the label media being inside the notch when the label media is received into the slot, the portion of the label media inside the notch being accessible from outside the slot.

25. The system of claim 11 for use with a multi-port station having a plurality of holes, wherein the backing portion of the label holder comprises a plurality of pegs receivable inside the plurality of holes of the multi-port station, and
 the backing portion of the label holder is configured to engage with the multi-port station by inserting of the plurality of pegs inside the plurality of holes of the multi-port station.

26. The system of claim 25 wherein each of the plurality of pegs is inserted into one of the plurality of holes and comprises split portions configured to maintain the peg inside one of the plurality of holes.

27. The system of claim 13, wherein the label holder further comprises a tensioned member having a contact portion configured to be in contact with a portion of the label media when the label media is received inside the slot.

28. The system of claim 13, further comprising:
 a notch in communication with the upwardly opening upper edge portion of the slot, a portion of the label media being inside the notch when the label media is received inside the slot, the portion of the label media inside the notch being graspable from outside the label holder.

29. The system of claim 13 for use with a multi-port station having a plurality of holes, wherein the rear facing portion of the label holder comprises a plurality of pegs receivable inside the plurality of holes of the multi-port station, and
 the rear facing portion of the label holder is configured to be couplable to the multi-port system by inserting of the plurality of pegs inside the plurality of holes of the multi-port station.

30. The system of claim 29 wherein each of the plurality of pegs is inserted into one of the plurality of holes and comprises split portions configured to maintain the peg inside one of the plurality of holes.

31. The system of claim 1 for use with a multi-port station comprising a first aperture and a second aperture spaced apart from the first aperture, wherein the label holder further comprises a first end portion opposite a second end portion, and the rear portion comprises:
 a first split peg positioned on the first end portion of the label holder for engagement with the first aperture of the multi-port station;
 a second split peg positioned on the second end portion of the label holder for engagement with the second aperture of the multi-port station;
 a first tensioning member comprising a first contact portion extending inwardly into the slot, the first tensioning member biasing the first contact portion into the slot and into engagement with the label media when the label media is received inside the slot;
 a second tensioning member comprising a second contact portion extending inwardly into the slot, the second tensioning member biasing the second contact portion into the slot and into engagement with the label media when the label media is received inside the slot; and
 a notch positioned between the first and second tensioning members, the first tensioning member being positioned between the notch and the first split peg, the second tensioning member being positioned between the notch and the second split peg.

32. The system of claim 31, wherein the first tensioning member further comprises a first tethered edge portion opposite a first free edge portion, the first contact portion being positioned on the first free edge portion and at least partially within the upwardly opening upper edge portion of the label holder, and
 the second tensioning member further comprises a second tethered edge portion opposite a second free edge portion, the second contact portion being positioned on the second free edge portion and at least partially within the upwardly opening upper edge portion of the label holder.

* * * * *